(12) United States Patent
Ali et al.

(10) Patent No.: US 12,457,049 B2
(45) Date of Patent: Oct. 28, 2025

(54) ADAPTIVE CALIBRATION OF ANALOG FRONT END AND RECEIVER NON-IDEALITIES

(71) Applicant: Apple Inc., Cupertino, CA (US)

(72) Inventors: Ahmed Mohamed Abdelatty Ali, Campbell, CA (US); Mansour Keramat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/581,137

(22) Filed: Feb. 19, 2024

(65) Prior Publication Data

US 2025/0266912 A1 Aug. 21, 2025

(51) Int. Cl.
*H04B 17/21* (2015.01)

(52) U.S. Cl.
CPC .................... *H04B 17/22* (2023.05)

(58) Field of Classification Search
CPC .. H04B 17/0085; H04B 17/336; H04B 17/20; H04B 17/345; H04B 3/466; H04B 17/22; H04B 17/21; H04B 17/00
See application file for complete search history.

(56) References Cited

U.S. PATENT DOCUMENTS

| | | |
|---|---|---|
| 1,071,608 A | 8/1913 | Dear et al. |
| 7,271,753 B1 * | 9/2007 | Padukone ............ G11B 5/6029 |
| 7,312,734 B2 | 12/2007 | McNeill et al. |
| 8,872,680 B2 | 10/2014 | Ali |
| 9,503,116 B2 | 11/2016 | Speir et al. |
| 9,998,134 B1 | 6/2018 | Stepanovic et al. |
| 10,340,934 B1 | 7/2019 | Rakuljic et al. |
| 10,541,763 B1 * | 1/2020 | Chongoushian .......... H04L 1/20 |
| 10,547,319 B2 | 1/2020 | Ali et al. |
| 10,574,250 B1 | 2/2020 | Braswell et al. |
| 10,659,069 B2 | 5/2020 | Ali et al. |
| 10,763,878 B2 | 9/2020 | Ali et al. |

(Continued)

OTHER PUBLICATIONS

Su, C. K., Hurst, P. J. and Lewis, S. H., A time-interleaved SAR ADC with signal-independent background timing calibration, IEEE Trans. Circuits and Systems-I: Regular Papers, 69 (2), pp. 620-633, Feb. 2022.

(Continued)

*Primary Examiner* — Khanh C Tran
(74) *Attorney, Agent, or Firm* — Kowert, Hood, Munyon, Rankin & Goetzel, P.C.; Dean M. Munyon

(57) ABSTRACT

Adaptive calibration of analog front-end and receiver non-idealities is disclosed. An analog front-end (AFE) circuit is configured to receive an analog input signal, and includes an analog signal path having one or more analog circuits. A test signal generator inputs an analog test signal into the analog signal path. The AFE circuit combines analog input signal and the test signal and generates, using one or more analog circuits in the analog signal path, an analog output signal based on the analog input signal combined with the analog test signal. A digital signal processing (DSP) circuit processes a digital input value that corresponds to the analog output signal, and performs calibrations of respective parameters of the one or more analog circuits. To perform the calibrations, the DSP circuit is configured to separate a digital representation of the analog test signal from a remainder of the digital value.

20 Claims, 26 Drawing Sheets

(56) References Cited

U.S. PATENT DOCUMENTS

| | | |
|---|---|---|
| 11,159,169 B2 | 10/2021 | Ali et al. |
| 11,431,416 B2 | 8/2022 | Gopalakrishnan et al. |
| 11,595,093 B2 | 2/2023 | Cohen et al. |
| 2003/0109999 A1* | 6/2003 | Stein .................. H03M 1/1038 702/86 |
| 2007/0262895 A1* | 11/2007 | Stein .................. H03M 1/1033 341/155 |
| 2012/0087451 A1* | 4/2012 | Razzell .................. H03D 7/00 375/350 |

OTHER PUBLICATIONS

Thijssen, B. J. et al. "Low-Power Highly Selective Channel Filtering Using a Transconductor—Capacitor Analog FIR", IEEE J. Solid State Circuits, 55(7), pp. 1785-1795, Jul. 2020.

Ali, A. M. A., et al., "A 12b 18GS/s RF Sampling ADC with an Integrated Wideband Track-and-Hold Amplifier and Background Calibration," IEEE ISSCC, 2020.

Panigada, A. and Galton, I. "Digital background calibration of harmonic distortion in pipelined ADCs", IEEE Trans on Circuits and Systems I: Regular Papers, 53(9), pp. 1885-1895, Sep. 2006.

Murmann, B. and Boser, B.E., "A 12 b 75 MS/s pipelined ADC using open-loop residue amplification," IEEE ISSCC, 2003.

Razavi, B., "Design consideration of interleaved ADCs", IEEE J. Solid State Circuits, 48 (8), pp. 1806-1817, 2013.

Tohidian, M. et al. "Analysis and Design of a High-Order Discrete-Time Passive IIR Low-Pass Filter", IEEE J. Solid State Circuits, 49(11), pp. 2575-2587, Nov. 2014.

Li, X., et al. "Background Correlation-Based Timing Skew Estimation Method for Time-Interleaved ADCs," IEEE Access, Mar. 2021.

* cited by examiner

ADAPTIVE CALIBRATION OF ANALOG FRONT END AND RECEIVER NON-IDEALITIES

BACKGROUND

Technical Field

This disclosure is directed to electronic circuits, and more particularly, to calibration of analog-front end circuitry in communications systems.

Description of the Related Art

Many communications systems, both wired and wireless, include analog front end (AFE) circuits in receivers. The AFE may comprise various types of circuits, including (but not limited to) analog filters, amplifiers, mixers, combiners, and so on. A signal path through these circuits may exist between a node (such as one coupled to an antenna) where an incoming signal is received, and an analog-to-digital converter (ADC) that converts the analog signal into a digital value. To ensure accurate operation of the system, calibrations may be carried out from time to time to ensure that the AFE is providing accurate information for conversion into the digital domain.

SUMMARY

Adaptive calibration of analog front end and receiver non-idealities is disclosed. In one embodiment, an analog front-end (AFE) circuit is configured to receive an analog input signal, and includes an analog signal path having one or more analog circuits implemented therein, including a circuit that performs a filtering function such as a low-pass or band-pass filter. A test signal generator is configured to input an analog test signal into the analog signal path. The AFE circuit combines analog input signal and the test signal and to generate, using one or more analog circuits in the analog signal path, an analog output signal based on the analog input signal combined with the analog test signal. A digital signal processing (DSP) circuit is configured to process a digital input value that corresponds to the analog output signal, and to perform calibrations of respective parameters of the one or more analog circuits. To perform the calibrations, the DSP circuit is configured to separate a digital representation of the analog test signal from a remainder of the digital value.

In one embodiment, the AFE circuit is part of a receiver in a communications system. The inputting of the analog test signal and the calibrations may be carried out concurrent with normal operations of the communications system. The analog test signal in various embodiments is uncorrelated with the analog input signal that carries information communicated between a transmitter and the receiver of the communications system. In one embodiment, the analog test signal is generated based on a pseudorandom sequence.

BRIEF DESCRIPTION OF THE DRAWINGS

The following detailed description makes reference to the accompanying drawings, which are now briefly described.

DETAILED DESCRIPTION OF EMBODIMENTS

Figure 1:
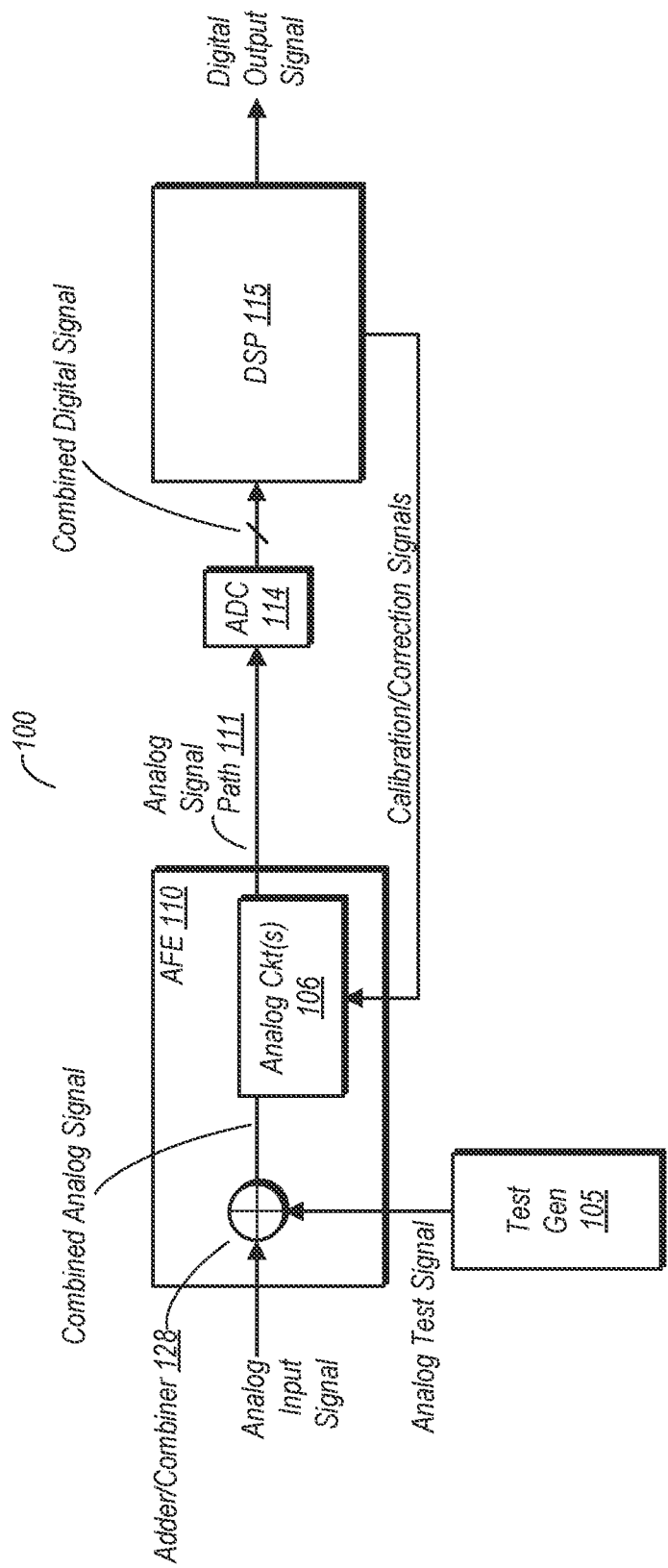
FIG. 1 is a block diagram of one embodiment of a system including an analog front-end (AFE) circuit and a digital signal processing (DSP) circuit.

As circuits in an analog front end (AFE) of a communications system (e.g., analog portion of a receiver) have become smaller while performance demands have increased, calibrations to get rid of non-idealities have become more expensive and difficult using traditional techniques. There is a need to lower power consumption and improve the performance of communication receivers and their radio frequency/intermediate frequency/baseband (RF/IF/BB) AFE circuits especially in wireless connectivity and applications where the high bandwidth, receiver sensitivity, and rejection requirements can lead to high power consumption, and in low power receivers of devices (e.g., Internet of Things, or IoT) and wake-up receivers. Moreover, in narrow-band applications, the linearity and accuracy requirements of the filter can lead to expensive implementations.

Digital assistance is a technique that enables performance improvement and/or power reduction in data converters, such as analog-to-digital converter (ADC) circuits. As the process technology shrinks, digital processing become more efficient at a steeper rate compared to analog circuits, which may even degrade with process shrink. The linearity, order and noise requirements of the filter, even in narrow-band applications often lead to expensive implementations. Moreover, as the speed and bandwidth requirements increase (e.g., from 4G to 5G to 6G), achieving the needed performance at reasonable power consumption becomes more challenging.

The present disclosure makes use of the insight that digital assistance could be extended to analog circuits, such as those that contain a filter (e.g., low-pass filter, bandpass filter, etc.) in an analog signal path of an AFE circuit prior to the ADC (and thus, prior to the incoming information being converted into the digital domain). A test signal (which may be referred to as a dither signal) may be injected into the AFE at a point in the signal path prior to the circuit(s) to be calibrated. In some embodiments, the test signal may be based on a pseudorandom sequence generated in a digital domain before converting it into an analog format. The test signal may be combined with an analog input signal (e.g., as received via an antenna) in the analog signal path of the AFE. For example, the test signal may be combined with the analog input signal prior to a filter or a variable gain amplifier in the analog signal path. This may ensure that the test signal will encounter various non-idealities in the analog signal path prior to conversion to digital by an ADC. Separate uncorrelated test signals can be injected before and after the filter to effectively and separately detect and correct the non-idealities that exist before and after the filter.

At the end of the analog signal path, the combined test signal and analog input signal may be converted into a digital format by an ADC. Thereafter, the digital representation of the test signal can be separated from the digital representation of the analog input signal, allowing for further processing in the digital domain by a digital signal processing (DSP) circuit.

A number of different parameters may be calibrated, such as DC gain, amplifier gain, filter response and coefficients, etc. Adjustments to the parameters of the calibrated AFE circuits may be carried out in the directly in the analog domain, indirectly in the digital domain, or by a combination thereof. For parameters adjusted in the analog domain, various embodiments of a DSP circuit may generate control signals that may be converted into an analog format suitable for making any adjustments to the circuits of the AFE.

In various embodiments, the calibrations may be carried out during normal operations (mission mode) of the system. When the calibration is carried out during normal operations, a test signal generated based on a pseudorandom sequence may be completely uncorrelated with the analog input signal that is received and processed to extract information therefrom. Embodiments are further possible and contemplated in which the AFE circuit can be taken offline for calibration, with the injection of a signal such as a sine wave as the test signal.

The various calibration techniques disclosed herein may allow relaxation of some analog circuit requirements for the AFE. With the ability to utilize digital assistance, significant improvements in the performance of the AFE circuits may be realized, including great performance in terms of signal-to-noise ratio as well as reduced power consumption. This may be achieved with less strict requirements of circuits of the AFE. The calibrations themselves may be carried out with a very small power overhead, and can track changes over different operating conditions (e.g., temperature changes).

Various embodiments of the calibration techniques and AFE circuits to which they may be applied are now discussed in further detail. The discussion begins with example embodiments of a receiver and AFE circuit thereof. Various embodiments of an AFE filtering circuit illustrating different mechanisms for inputting a test signal are then described, followed by descriptions of techniques for correcting non-linearities. A multi-channel AFE is described thereafter, along with the cancellation of interleaving mismatches. Methods of carrying out calibrations are then described in terms of method flow diagrams. The description concludes with a discussion of example systems in which the various circuits may be implemented and a computer readable medium that may be used to manufacture a circuit in accordance with the disclosure.

AFE Circuits with Test Signal Injection:

FIG. 1 is a block diagram of one embodiment of a system including an analog front-end (AFE) circuit and a digital signal processing (DSP) circuit. In the embodiment shown system 100 may be part of a receiver in a communications system, such as a wireless system or a high-speed serial link. System 100 as shown here includes AFE circuit 110 that may contain a filter, an ADC 114, and a DSP circuit 115. An analog signal path 111 extends between the input for the analog input signal and ADC 114.

AFE circuit 110 in the embodiment shown includes an adder/combiner circuit 128 that is configured to combine analog signals. Adder/combiner circuit 128 may be implemented in a number of ways, and may be as simple as a single filter circuit node. AFE circuit 110 may also include a variety of analog circuits, represented generally here as analog circuit(s) 106. Such circuits may include various types of amplifiers (e.g., fixed gain, variable gain, low noise), different filter circuits (e.g., low-pass, high-pass, bandpass, finite impulse response, infinite impulse response, etc.), mixers (e.g., for frequency down conversion from radio frequency to intermediate frequency or baseband frequency), voltage-controlled oscillators (VCOs), and so on. In general, any type of analog circuit usable in an AFE circuit of, e.g., a receiver in a communications system may be implemented as one of the analog circuits of AFE circuit 110.

System 100 also includes a test signal generator 105, which is configured to generate a test signal. In some embodiments, the test signal may be generated based on a pseudorandom sequence. The pseudorandom sequence may be generated in the digital domain for some embodiments (e.g., using a linear feedback shift register), with the digital value being converted into an analog signal using a digital-to-analog converter (DAC) circuit. Embodiments in which a pseudorandom signal is generated in the analog domain (e.g., using noise from an amplifier, etc.) are possible and contemplated, with the pseudorandom signal being used as the test signal.

In various embodiments, the analog test signal generated by test signal generator 105 may be completely uncorrelated with the analog input signal received by system 100. This may enable calibrations and corrections to be carried out during normal operations (i.e. mission mode). For example, in embodiments where system 100 comprises a receiver of a communications system, analog signals carrying information may be received and processed per the system's intended operation while test signals are injected into the analog signal path 111 and calibrations/corrections are carried out in the background. Conducting background calibrations during mission mode operations may allow adjustments to the operation of AFE circuit 110 (and the circuits therein) to track changes to operating conditions (e.g., temperature changes).

In some embodiments, test signal generator 105 may also be capable of generating other types of test signals, such as sine waves or more complex signals. When using such test signals, system 100 may be briefly taken offline to conduct such calibrations. In various embodiments, offline calibrations may be conducted during, e.g., system startup, during an awakening from a sleep mode, or periodically.

Although test signal generator 105 is shown here as a separate entity, embodiments are possible and contemplated in which the test signal generator is incorporated into DSP circuit 115. In such embodiments, DSP circuit 115 may include circuits for generating a digital representation of the test signal, and may also include a DAC circuit for converting the digital representation into the analog test signal.

In the embodiment shown, both the analog input signal and the analog test signal are input into adder/combiner 128 to produce a combined analog signal that is received by the various analog circuit(s) 106. Accordingly, the combined signal (and thus its components, the analog test signal and the analog input signal) both encounter any non-idealities of the analog circuit(s) 106, including filtering circuits implemented therein. After having encountered the non-idealities of the analog circuit(s) 106 (and thus possibly having been altered thereby), the combined signal 114 is converted into a digital format by ADC 114 to produce a combined digital signal that is input into DSP circuit 115.

DSP circuit 115 may extract the payload carried in the original analog input signal present in the combined digital signal using any suitable digital techniques. For example, if system 100 is a receiver in a communications system, the information contained within the analog input signal may be extracted from the combined digital signal for further processing. After extracting the portion of the combined digital signal corresponding to the analog input signal, the remaining portion corresponds to the analog test signal. This information may be analyzed to determine the non-idealities in the analog circuit(s) 106 and perform calibrations and generate correction signals. In one embodiment, the remaining portion of the combined digital signal may be analyzed relative to a pseudorandom sequence upon which the analog test signal was based. Using these differences, the non-idealities in the analog circuit(s) 106 may be determined.

By injecting the analog test signal into the analog signal path 111, a number of different idealities may be detected and corrected. These non-idealities include (but are not limited to) the following:

The bandwidth, gain and quality factor of the anti-aliasing, blocker-rejection, and band-select filters and frontend amplifiers;

Non-linearities of filters, amplifiers and an ADC, including both in-band and out-of-band non-linearity;

Interleaving non-idealities (mismatches) among the different channels of a filter, programmable gain amplifier, receiver slices or ADC, including gain, transfer function, timing and bandwidth mismatches;

I/Q mismatch of the receiver in a communications system that utilizes quadrature amplitude modulation; and Other non-idealities that can be calibrated using the analog test signal.

Based on the performed calibrations, DSP circuit 115 may generate various calibration/correction signals that are fed back to analog circuit(s) 106. Some of these signals may be generated digitally and then converted into an analog format using a DAC present in DSP 115. However, where appropriate, digital signals may be utilized. The signals may be used to adjust various circuit parameters, such as the gain of various amplifiers, filter bandwidths, and compensations for non-linearities.

The various calibration techniques disclosed here may have a fast start-up time. Their tracking time varies depending on the specific nonideality for which calibration is being performed, but may nevertheless be fast enough to track environmental conditions without difficulty. As noted above, the calibrations may be performed concurrent with mission mode, and thus detection of non-idealities can be performed in the background without disrupting normal, intended system operation and independent of signal conditions, thereby allowing the tracking of changes in temperature, supply, aging, and so on. Corrections may be carried out in the analog, the digital domain, or a combination of the two. Analog correction may be carried out in some cases, such as performing corrections for AFE filter characteristics and in non-linear correction. However, for a number of different parameters, digital correction may be performed by compensating in the digital domain.

Test signal injection, subtraction and correction of the non-ideality are operations that may be carried out at the full operational rate. Estimation processing may occur at a slower (or duty-cycled) rate. As a result, the power overhead of the various calibration techniques disclosure herein may be small compared to the potential power saving. Furthermore, test signal injection, subtraction and correction may be duty-cycled as well if it is desirable to reduce power consumption even further.

As noted above, while many of the calibrations described herein may be carried out in the background during normal operations, the various calibration techniques may be applied to the injection of tones while taking the system offline. Single or multiple tones may be applied using, e.g., sine waves, with the multiple tones comprising sine waves of different frequencies. Since these calibrations may require taking the system offline, they may be performed at specific times (e.g., during system startup) while the background calibrations are performed at other times to increase system availability.

Figure 2:
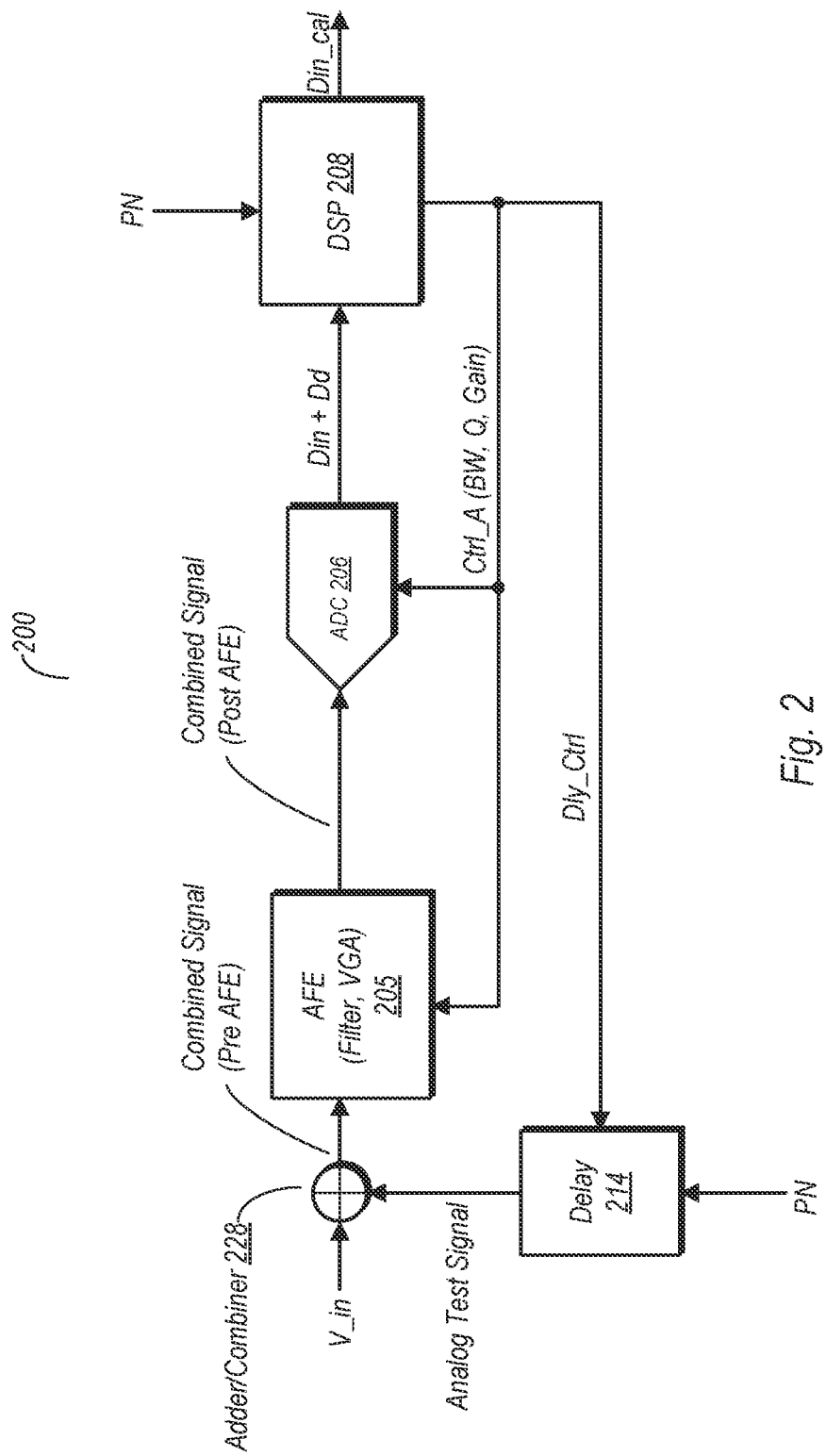
FIG. 2 is a block diagram of a system including an analog front-end (AFE) circuit and a digital signal processing (DSP) circuit, with the AFE including a filter.

FIG. 2 is a block diagram of a system including an analog front-end (AFE) circuit and a digital signal processing (DSP) circuit. In the embodiment shown, system 200 includes an AFE circuit 205, which may include circuits therein including filters, amplifiers (such as a variable gain amplifier), and other types of circuits that may be utilized in, e.g., analog communications systems. The output of the AFE circuit 205 is provided to ADC 206, which in turn is coupled to DSP circuit 208. System 200 also includes a delay circuit 214, which is coupled to receive the test signal (PN) and a delay control signal from DSP 208.

The analog test signal is generated based on a pseudorandom sequence to which delay is provided before it is forwarded to adder/combiner 228. It is noted that delay circuit 214 in the embodiment shown may receive the pseudorandom sequence as a digital signal, and may thus include DAC circuitry configured to convert it into analog format before applying the delay. However, embodiments in which the pseudorandom sequence has already been converted into analog format prior to being provided to delay circuit 214 are also possible and contemplated. The pseudorandom sequence is also provided to DSP 208 in the embodiment shown for use as a basis for comparison during the calibration routines. It is noted that, in various embodiments, DSP circuit 208 may include circuitry (e.g., a linear feedback shift register) for generating a pseudorandom sequence, and thus may be its source.

In this particular embodiment, adder/combiner 228 is configured to combine an input signal, V_in, with the analog test signal as output from delay circuit 214 to generate a combined analog signal. This combined analog signal is provided to the circuit of AFE 205. A modified version of the combined analog signal (e.g., after filtering, amplification, down conversion, etc.) is output from AFE 205 to ADC 206. ADC 206 converts the post-AFE combined analog signal into a digital signal that includes components corresponding to the input signal V_in (the D_in components) as well as components that correspond to the analog test signal (the Dd components). These components are then provided to DSP circuit 208, where the Din and Dd components are separated from one another. The Din components may be processed to recover the information conveyed in the input signal per normal system operations. The Dd components may be used in the calibration routines carried out to calibrate AFE circuit parameters such as filter bandwidth, quality factor, amplifier gain, and so on. DSP circuit 208 may carry out these calibrations at least in part by measuring differences between the pseudorandom sequence and the Dd components, and may generate corresponding control signals that are provided to both AFE 205 and ADC 206. Additionally, DSP 208 may generate delay control signals provided to delay circuit 214.

In various embodiments of AFE 205, a filter may be used for anti-aliasing filtering, image rejection, blocker rejection, band selection, etc. Implementation of this filter can be in the form of active-RC, gm-C, passive, switched capacitor filter, N-Path filter, or any other suitable type. While operational amplifier-based active-RC filters tend to have the high performance, they also tend to consume a significant amount of power and have lower bandwidths relative to other types due to their reliance on closed-loop operational amplifiers. More particularly, the bandwidth of such a filter may be dependent on RC time constants and hence can change with temperature, which require tuning. Open-loop gm-c (transconductance-capacitive) filters may achieve higher bandwidths and lower power consumption, but may suffer from larger variability with temperature, power supply and aging because of their open loop nature and the variability of the transistor transconductance. In addition, open-loop gm-c filters may suffer from worse linearity than their active-RC counterparts. Passive LC filters and switched capacitor circuits can be area intensive at low frequencies and can still suffer variation with conditions.

Tuning is may be used to help stabilize filter performance across conditions. However, analog tuning often times relies on PLL or VCO circuits that are complex, difficult to design and suffer from analog non consumption. In addition to the simple implementation and the power, the digitally-assisted calibration techniques disclosed herein, can be utilized to calibrate other non-idealities in the system using the same test signals. Accordingly, this makes the techniques disclosed herein well-suited to calibrate filters in an AFE.

To calibrate a low-pass filter, a test signal (e.g., based on a pseudorandom sequence as described elsewhere herein) is injected in the filter or in any point preceding the filter in the signal chain. The test signal can be based on sequence having two or more levels in which the corresponding analog magnitudes are flexible. The test signal may be uniformly distributed with zero mean and white noise. By passing through the filter, the test signal will "see" the same transfer function as the main analog input signal. The amplitude of the analog test signal can be quite small (e.g., less than 1/10th of the dynamic range). This may reduce the impact on the dynamic range of the ADC to a very small amount (e.g., less than 1 dB). In various embodiments, a digital representation of the test signal is filters in the DSP circuit by an equivalent digital filter. The digital filter may be a z-transformed version of an analog anti-aliasing filter in the AFE, and hence represents the "desired" transfer function. The transformation may be carried out using the impulse invariant method or any other method that preserves the shape of the transfer function. The difference between the digital representation of the test signal received from the analog signal path, via the ADC, and the digitally-filtered version of the original test signal represents an error signal. Correlating between the two using a least-mean squares (LMS) loop whose output is feedback to the analog filter in the AFE, the loop may adjust (i.e. tune) the filter to minimize the square error, which would happen when the parameter being adjusted matches the desired response. For example, to adjust the bandwidth of the filter, a parameter can be fed back that tunes the bandwidth of the filter. This could be the current of a transconductance stage in a gm-c filter, the resistance in an RC filter, or a tuning/trimming capacitance in any type of the filter. An example of this is shown below in FIG. 6, and may be given by the following equation:

$$w(n+1)=w(n)-\mu PN(D_s-h_d*PN) \qquad (1),$$

where w is the parameter in the filter of the AFE that controls the bandwidth, $h_d$ is the z-transformation of the desired filter impulse response, PN is the pseudorandom sequence that forms the basis for the injected test signal, μ is the step size, and * is the convolution operation.

The DC gain of the filter can be calibrated in a similar manner. In this case the digital signal and dither may be filtered by a narrow digital low pass filter in order to isolate the DC gain and remove the effect of the filter roll-off. This filtering can be done in the analog domain before injection or in the digital domain. The correction can be done using feedback to control the gain or in the digital domain. This may be expressed by the following equation:

$$G(n+1)=G(n)-\mu(h_{dc}*h_d*PN)(h_{dc}*D_{sG}-h_{dc}*h_d*PN) \qquad (2),$$

where G is the DC gain (as applied in the digital domain) or a gain control parameter that is fed back to the analog filter to control the gain, $h_{dc}$ is the impulse response, $h_d$ is the z-transformation of the desired filter impulse response, and $D_{sG}$ is the gain-corrected digital signal. Given the low bandwidth of the DC filter, filtering with $h_d$ in addition to $h_{dc}$ may be redundant for PN, and they can be merged. If the correction is applied in the digital domain, then $D_{sG}$ is given by:

$$D_{sG}=GD_s \qquad (3),$$

where $D_s$ is the digital representation of the signal. If G is adjusted in the analog domain, then $D_{sG}$ becomes:

$$D_{sG}=D_s \qquad (4).$$

If the quality factor, Q, of the filter needs to be tuned, the gain of various sections of the transfer function can be estimated. The tuning can be done accordingly to adjust the amplitude/peaking of various sections. This is given by:

$$G_b(n+1)=G_b(n)-\mu(h_{band}*h_d*PN)(h_{band}*D_{sG}-h_{band}*h_d*PN) \qquad (5),$$

where $G_b$ is the band-specific gain (applied in the digital domain) and $h_{band}$ is the impulse response of the specific bandpass filter.

Alternatively, the band-specific filtering can be performed by shifting the specific band to DC followed by low-pass filtering to ensure consistency. In this case, $h_{band}$ would be composed of a frequency shifter followed by a low-pass filter. For a bandpass filter, the transfer function can be divided into sections as mentioned before. Alternatively, if the center frequency needs to be calibrated, while the quality factor is reasonably adjusted, a loop that targets the center frequency can be employed to achieve the desired tuning in a more efficient manner. A special case is a switched-capacitor filter, which will be discussed in further detail below with reference to FIGS. 7A-7C.

Non-linearities represent another issue that may occur in circuits of an AFE, such as in filters, amplifiers, and ADCs. Accordingly, the disclosure contemplates calibrations designed to compensate for and/or remove non-linearities, e.g., in the presence of a filtering transfer function. In addition, once calibration is employed, the design on the analog side can take advantage of it by optimizing for better degradation (i.e. slope) with frequency.

Since the test signal and the analog input signal are filtered by the AFE, traditional calibration techniques may not be effective. Non-linearity may be estimated in the digital domain, with correction being carried out in either the analog or digital domains (as will be discussed in further detail below with reference to the embodiments of FIG. 9A-9D). An effective technique is to feedback and inverse of the non-linearity to cancel the original non-linearity. Various calibration procedures to carry this out are also discussed in further detail below, e.g., in FIGS. 10-15.

Figure 3:
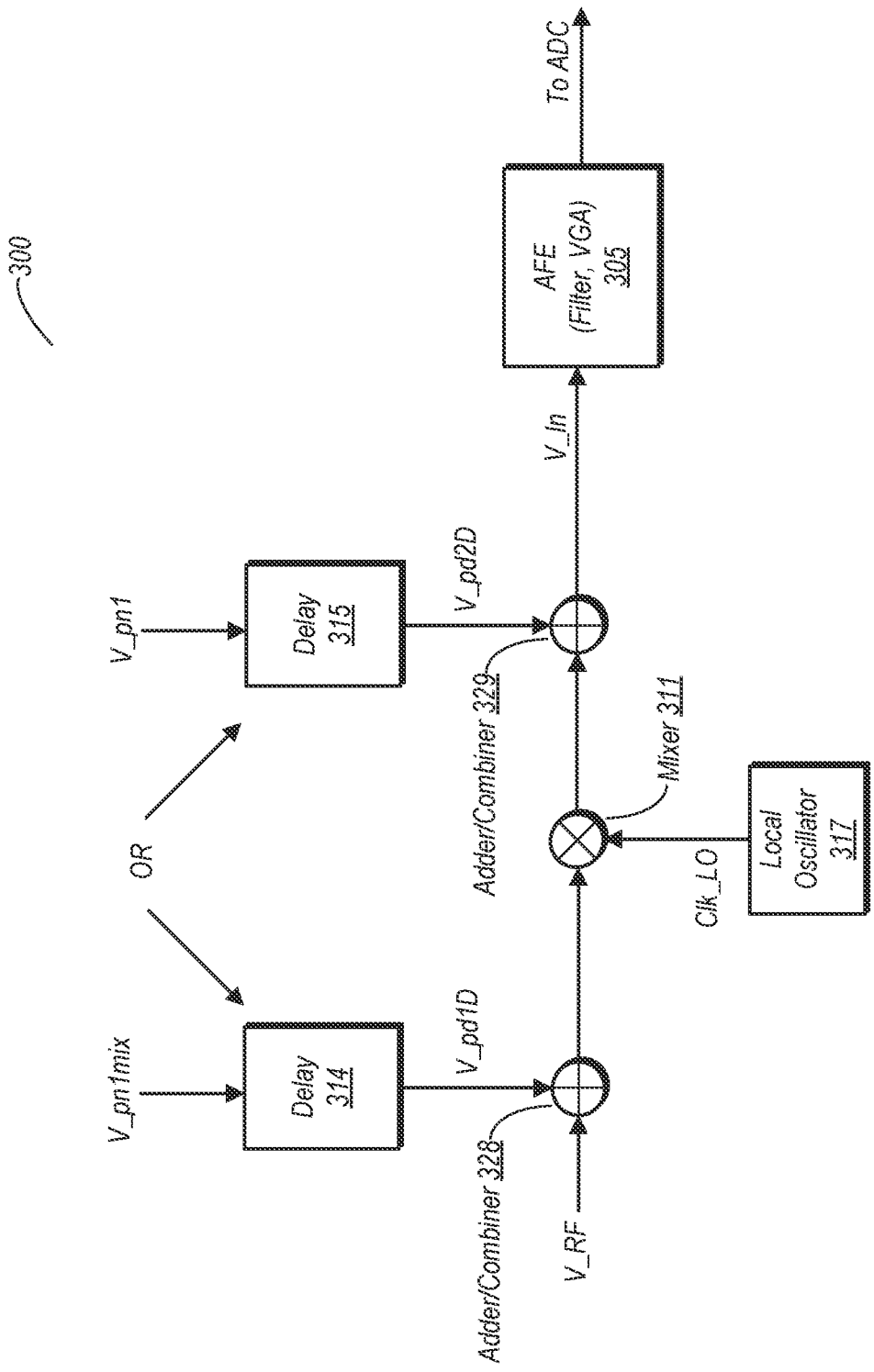
FIG. 3 is a block diagram illustrating the injection of a test signal into one embodiment an AFE circuit.

Test Signal Injection for Various AFE Embodiments:

FIG. 3 is a block diagram illustrating the injection of a test signal into one embodiment an AFE circuit. In the embodiment shown, system 300 includes an AFE 300 that is preceded by a signal path in which a radio frequency (RF) signal, V_RF, is provided as an input. The signal path also includes a mixer 311 for performing, e.g., down conversion of the RF input signal to a baseband frequency. The down conversion may be carried out by mixing the RF signal with a periodic signal, Clk_LO, generated by local oscillator 317.

In this embodiment, a test signal may be injected into the analog signal path prior to mixer 311. A pseudorandom sequence, V_pn1mix, or analog signal generated based thereon, may be provided to delay circuit 314. After providing an appropriate amount of delay, an analog test signal, V_pd1D, is input into adder/combined 0 and combined with the input signal, V_RF in adder/combiner 328. When the analog test signal is injected prior to mixer 111, it may be in a frequency band corresponding to the carrier frequency of the input signal V_RF. The combined analog test signal and input signal may then be down converted by mixer 311.

Alternatively, a test signal may be injected following mixer 311. A pseudorandom sequence V_pn1, or analog signal based thereon, may be provided to delay circuit 315. After applying the appropriate amount of delay, delay circuit 315 outputs a test signal V_pd2D to adder/combiner 329. Since the test signal is being injected into the signal path after down conversion, it may have a frequency corresponding to that of a down converted signal output from mixer 311. The down converted signal and the test signal are then combined by adder/combiner 329 and input as a combined signal, V_In, to AFE 304.

Inputting the test signal prior to the mixer 311 may allow for some calibrations thereof, and the local oscillator 317, to be performed. Some embodiments that utilize test signal injection prior to mixer 311 may include receivers that are part of a system that utilizes quadrature amplitude modulation (QAM). In such cases, the injection prior to the mixer may allow for calibrations to correct I/Q mismatches that may occur.

In embodiments where the test signal is injected following down conversion, mixer 311 and local oscillator 317 may be calibrated separately from AFE 305. Thus, if system 300 is, for example, a receiver in a QAM system, calibration for I/Q mismatches may be performed separate from calibration of the various circuits that make up AFE 305.

Figure 4:
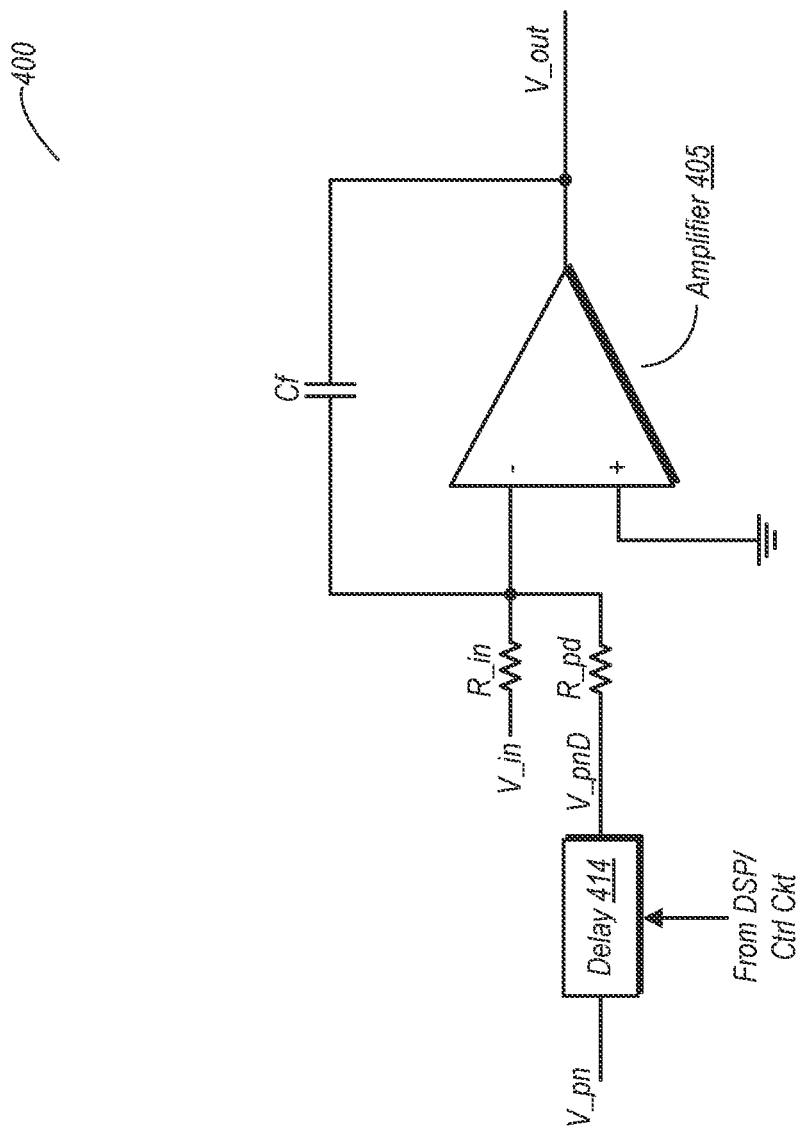
FIG. 4 is a schematic diagram illustrating the injection of a test signal into an amplifier of an RC filter used in an AFE circuit.

FIG. 4 is a schematic diagram illustrating the injection of a test signal into an amplifier of an RC filter used in an AFE circuit. In the embodiment shown, RC filter 400 may be a filter that is implemented in an AFE circuit. RC filter 400 includes an amplifier 405, with a feedback capacitor Cf coupled between its output and its inverting input. A first resistor, R_In, is coupled between an input signal node and the inverting input. An input signal, V_in, may be provided on the input node and conveyed to through R_In. A second resistor, R_pd, is coupled between a delay circuit 414 and the inverting input. A test signal, V_pnD, may be provided through R_pd to the inverting input of amplifier 405. Other resistor-based signal injections can also be employed that combine the test signal and the main signal resistively into a high impedance node such as the input of a Gm circuit as shown in FIG. 5A.

The test signal may be based on a pseudorandom sequence. V_pn, as shown here, may be the pseudorandom sequence in digital form, where it is input into delay circuit 414, converted into an analog signal, and delayed by some amount. Alternatively, V_pn may be input to delay circuit 414 as an analog signal generated elsewhere (e.g., in a DSP circuit) based on a pseudorandom sequence. The amount of delay provided by delay circuit 414 may be variable, and may be under the control of a control circuit or a DSP circuit.

RC filter 400 in the embodiment shown may be implemented as part of an AFE circuit. In one embodiment, RC filter 400 may be the first circuit of the AFE in the analog signal path that is encountered by the input signal, and thus the combined signal that also includes the injected test signal.

Figure 5A:
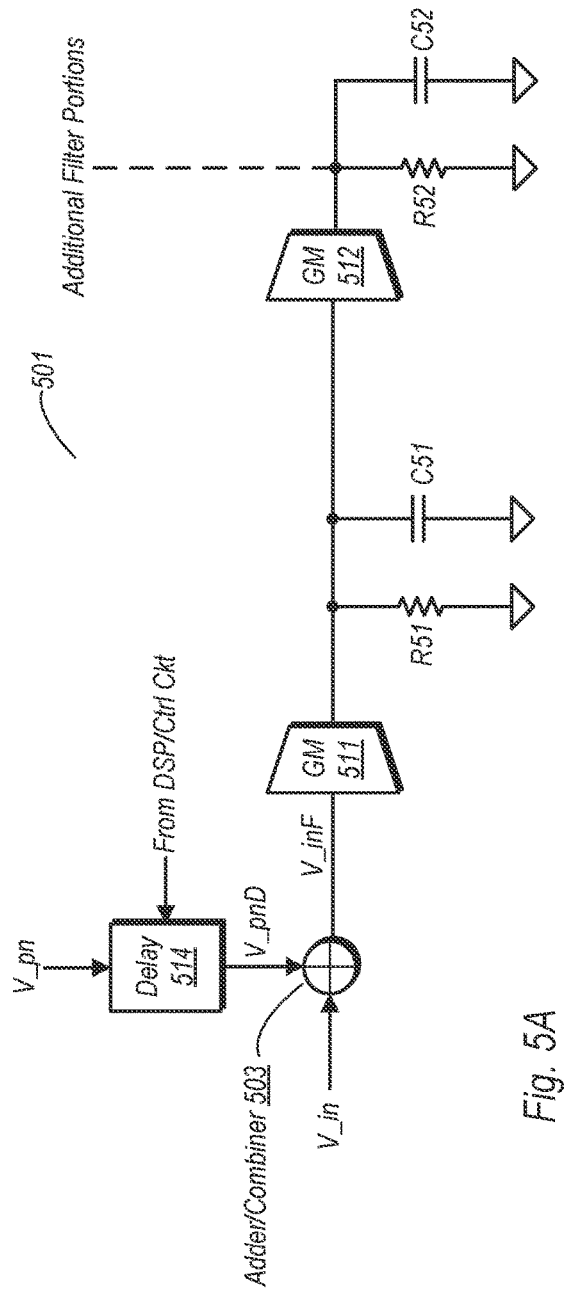
FIG. 5A is a diagram illustrating the injection of a test signal into one embodiment of a transconductance filter.

FIG. 5A is a diagram illustrating the injection of a test signal into one embodiment of a transconductance-capacitive (gm-c) filter. In the embodiment shown, filter 501 includes two transconductance circuits (e.g., amplifiers) which may, in one embodiment, be unity gain amplifiers.

An analog input signal, V_in and an analog test signal, V_pnD may be received by adder/combiner 503 that can be a resistive or a capacitive adder. The analog test signal in the embodiment shown is generated on an input signal, V_pn, which corresponds either to a pseudorandom sequence in the digital domain, or an analog signal generated based on the pseudorandom sequence. Delay circuit 514 may provide delay to the signal in accordance with one or more control signals from a DSP/control circuit. In the case where V_pn is received as a digital signal, delay circuit may also incorporate DAC circuitry in order to generate the test signal as an analog signal.

A first transconductance amplifier 511 is coupled to receive the combined analog input and test signal, V_inF. The output of transconductance amplifier 511 is coupled to a first parallel combination of resistor R51 and capacitor C51, as well as to the input of a second transconductance amplifier 512. The output of the second transconductance amplifier 512 is coupled to a second parallel combination of resistor R52 and capacitor C52.

Although not shown here, filter 501 may include additional portions, such as another signal path similar to the one shown here.

Figure 5B:
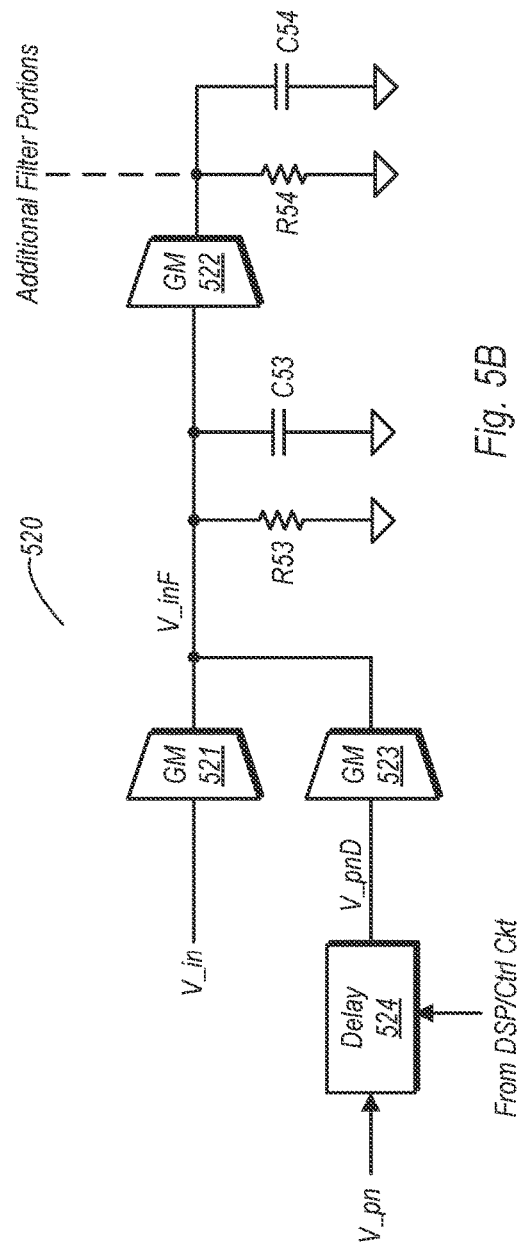
FIG. 5B is a diagram illustrating the injection of a test signal into another embodiment of a transconductance filter.

FIG. 5B is a diagram illustrating the injection of a test signal into another embodiment of a transconductance filter. In this particular embodiment, the input signal to transconductance filter 520, V_in, is received directly by transconductance amplifier 521. A second transconductance amplifier is coupled to receive the analog input signal V_pnD from delay circuit 524. The respective outputs of transconductance amplifiers 521 and 522 are coupled to on another on a common node, where the input signal and the test signal are combined generate the combined signal, V_inF. The combined signal in this embodiment is low-pass filtered by the combination of resistors R53 and C53, and input into transconductance amplifier 522. The signal output from transconductance amplifier 522 may also be low-pass filtered by R54 and C54.

Similar to the embodiment of FIG. 5A, transconductance filter 520 may include additional portions that are not shown here.

Figure 6A:
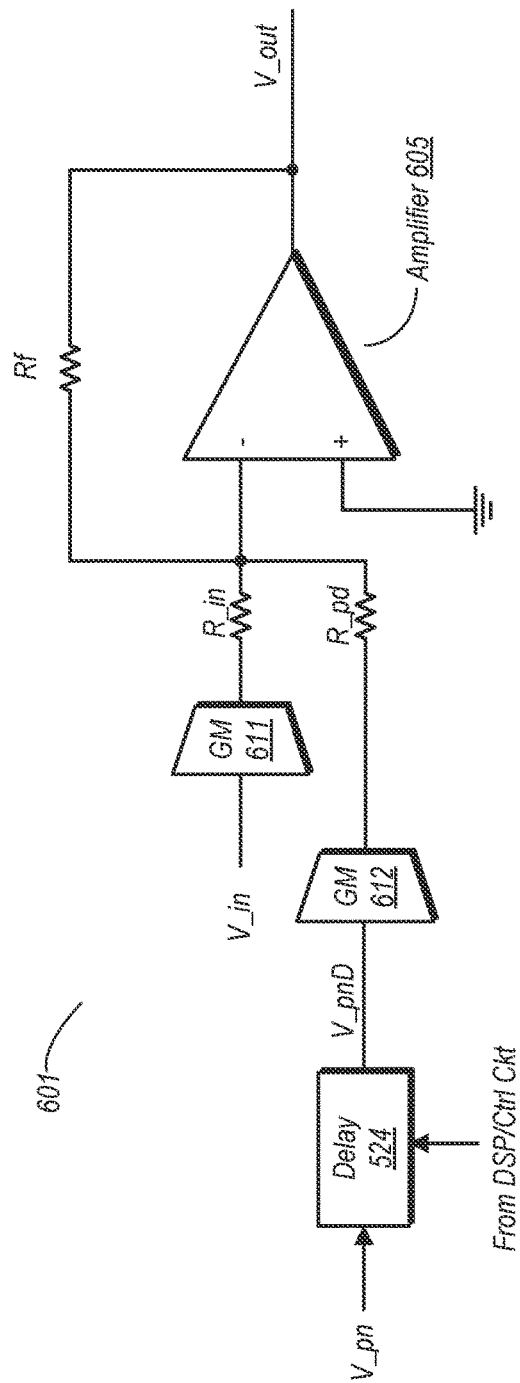
FIG. 6A is a diagram illustrating the injection of a test signal into one embodiment of an AFE circuit including a transconductance filter and an amplifier circuit.

FIG. 6A is a diagram illustrating the injection of a test signal into one embodiment of an AFE circuit including a transconductance filter and an amplifier circuit. In this embodiment, transconductance amplifier 611 is coupled to receive the input signal, V_in, and output an amplified version of the same to be conveyed through resistor R_in to the inverting input of amplifier 605. The analog test signal, V_pnD, is received by transconductance amplifier 612, and provided as an amplified version that is conveyed through resistor R_pd to the inverting input of amplifier 605, where a combined test and input signal is generated. A feedback resistor is coupled between the output and the inverting input amplifier 605, and thus the output, V_out, is an inverted version of the combined signal.

Figure 6B:
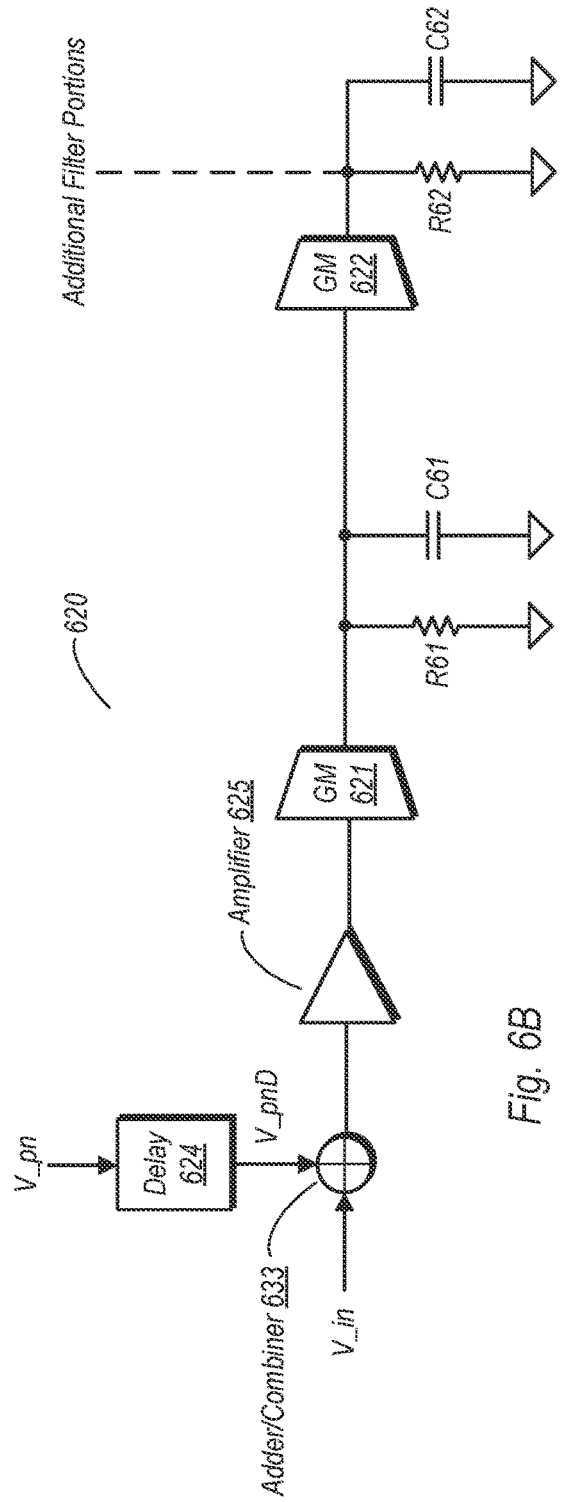
FIG. 6B is a diagram a diagram illustrating the injection of a test signal into another embodiment of an AFE circuit including a transconductance filter and an amplifier circuit.

FIG. 6B is a diagram a diagram illustrating the injection of a test signal into another embodiment of an AFE circuit including a transconductance filter and an amplifier circuit. In this embodiment, an amplifier (e.g., a variable gain amplifier) precedes a gm-C filter. The analog input signal and test signal are combined at adder/combiner 633 and input into amplifier 625. The output of amplifier 625 in the embodiment shown is provided to a gm-C filter comprising unity gain transconductance amplifiers 621 and 622, each of which are followed by a parallel RC combination for low-pass filtering.

Figure 7A:
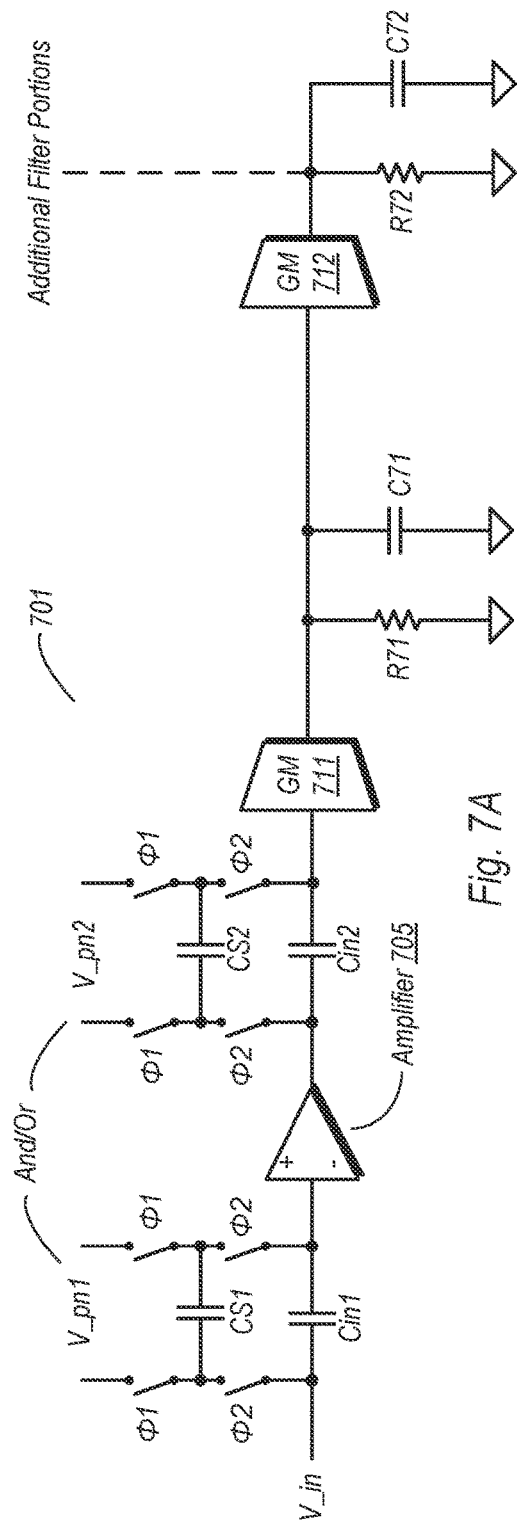
FIG. 7A is a diagram illustrating the use of one embodiment of a switched capacitor circuit to inject a test signal into one embodiment of an AFE circuit that contains a filter.

FIG. 7A is a diagram illustrating the use of one embodiment of a switched capacitor circuit to inject a test signal into one embodiment of an AFE circuit. In the embodiment shown, AFE circuit 701 includes an amplifier 705 followed by a gm-C filter with two transconductance amplifiers 711 and 712 with low-pass RC filtering on their respective outputs.

In this embodiment, one or both of two test signals may be input into the analog signal path and combined with the input signal, V_in. Test signal V_pn1 may be input into the signal chain prior to the input of amplifier 705, thus resulting in amplification of the combined signal. Alternatively, or in addition to, test signal V_pn2 may be input following amplifier 705. A given test signal may be input in accordance with the illustrated switches. A first set of switches closes on phase φ1, charging a corresponding capacitor (CS1 or CS2). On a second phase, φ2, charge is transferred to a second capacitor (Cin1 or Cin2), and thus into the signal path. The timing of the clocks that controls the switches may determine the test signal injection timing. The test signal may have a frequency (or frequency components) that match the sample rate of a filter or ADC following the amplifier.

Figure 7B:
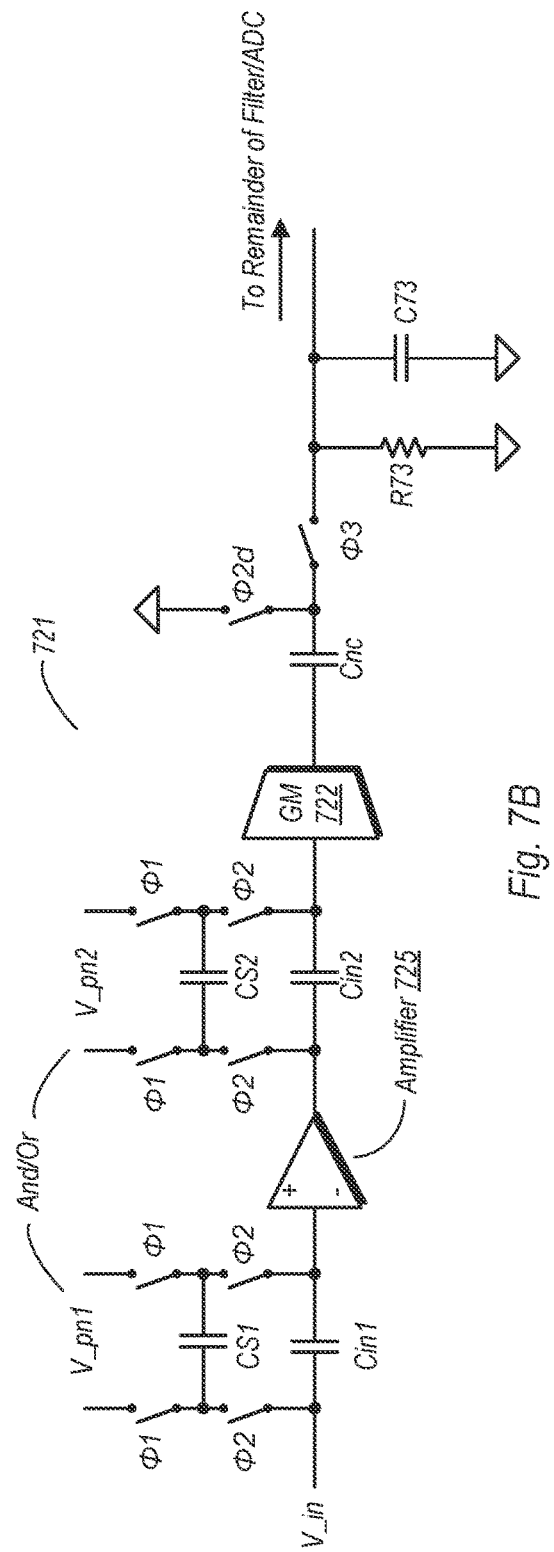
FIG. 7B is a diagram illustrating the use of another embodiment of a switched capacitor circuit to inject a test signal into another embodiment of an AFE circuit that contains a filter.

FIG. 7B is a diagram illustrating the use of another embodiment of a switched capacitor circuit to inject a test signal into another embodiment of an AFE circuit. In the embodiment shown, AFE circuit 721 implements a switched-capacitor FIR filter that includes switched capacitor circuitry for inputting a test signal. The circuit may include a switched capacitor circuit for inputting a test signal prior to amplifier 725, and may also or alternatively include a switched capacitor circuit for inputting a test signal following the amplifier. The circuit also includes transconductance amplifier 722, a noise-cancelling capacitor Cnc, a switched coupled between the analog signal path and ground, another switch in series with the analog signal path, and RC low-pass filtering circuitry following the series switch.

The relative timing of the clocks that control the switches may determine the timing of the test signal injection. The frequency of the variation of transconductance amplifier 722, $f_w$, is usually much larger than the sampling frequency $f_s$. The test signal may be injected at $f_w$ to calibrate the transconductance amplifier 722 (which acts as an integrator) or at $f_s$ to calibrate the overall response. Noise cancelling capacitor Cnc is optional. This capacitor may be charged in accordance with φ2d, which is in phase with φ2 but with a delayed falling edge. The charge can then be transferred down the analog signal path in accordance with φ3, which may be a phase of a separate clock signal or in phase with φ1.

For the FIR filter shown in FIG. 7B, a calibration algorithm can be employed for multiple instances of transconductance amplifier 722 (e.g., coupled in parallel) by binning the processing (correlation) based on the instance being used and the corresponding test signal. The test signal can be applied to specific instances of the multiple transconductance amplifier in a round robin fashion, or can be applied to all instance at the fast rate $f_w$, and binned for each instance separately at the slower rate, $f_s$. In this manner, the processing may be carried out at a decimated rate.

The response for a filter such as that shown in FIG. 7B may be given by the following equation:

$$H(f) = \frac{gm_{ave}T_i}{c_i}\sin c\left(\frac{f}{f_w}\right)e^{-\frac{j2\pi f}{f_w}}\sum_{a=0}^{n}k_a z^{-a}, \quad (6)$$

where $T_i$ is the integration time of the transconductance amplifiers $gm_{ave}$ is the average transconductance of the parallel coupled transconductance amplifiers, $C_i$ is the integration capacitance, and a is the FIR tap order. The coefficient $k_a$ may be given by the following:

$$k_a = g_m(a)/g_{mave} \quad (7).$$

Therefore, in this special case, the filter characteristics may be defined by time-variant gain terms that can be calibrated by detecting the gain at each transconductance cycle. This can be done by injecting the test signal at the high frequency $f_w$ and binning the test signal correlation based on the cycle to detect the individual transconductances of the filter (the transconductance for each transconductance amplifier). The test signal may be applied to only one transconductance amplifier at a time, or can be applied to all at the fast rate, $f_w$, and binned in a subsequent DSP circuit for each transconductance separately by synchronously decimating the corresponding bits down to $f_s$ at the corresponding transconductance cycle. This way, the processing can be carried out in the DSP at the decimated rate. The FIR coefficients can then be detected and corrected in accordance with the following equation:

$$G_a(n+1) = G_a(n) - \mu PN(a)[D_s - G_a(n)(h_{sinc}*PN(a))] \quad (8),$$

where $G_a$ is the filter coefficient (gain) term that captures the $g_m(a)$ terms, and $h_{sinc}$ is the impulse response of the sinc function frequency response.

Another important special case is the switched-capacitor discrete time filter formed by charge rotation, as described by equation (6) above. In this case the test signal can be injected at the fast rate of the filter switching $f_w$ to calibrate individual coefficients, or at the slower rate $f_s$ to calibrate the overall response. The filter transfer function may be given by the following:

$$H(z) = \gamma\left(\frac{1-a}{1-az^{-1}}\right)^n, \quad (9)$$

where γ is a constant, n is the order and a is defined by ratio of capacitances. The filter's parameters defining the DC gain and bandwidth can be calibrated as described previously in equations (1) to (5) as follows:

$$\alpha_{BW}(n+1) = \alpha_{BW}(n) - \mu PN(D_s - h_d*PN) \quad (10),$$

Or $$\alpha_{Gain}(n+1) = \alpha_{Gain}(n) - \mu \cdot (h_{dc}*h_d*PN) \cdot (h_{dc}*D_s - h_{dc}*h_d*PN) \quad (11).$$

It is noted that the digital filtering that is carried out as part of the process may be duty cycled at a significantly reduced rate. Therefore, the power consumption of the process is dominated by the correction and the test signal injection and subtraction, which is small relative to the processing of the normal (mission mode) signals.

Figure 7C:
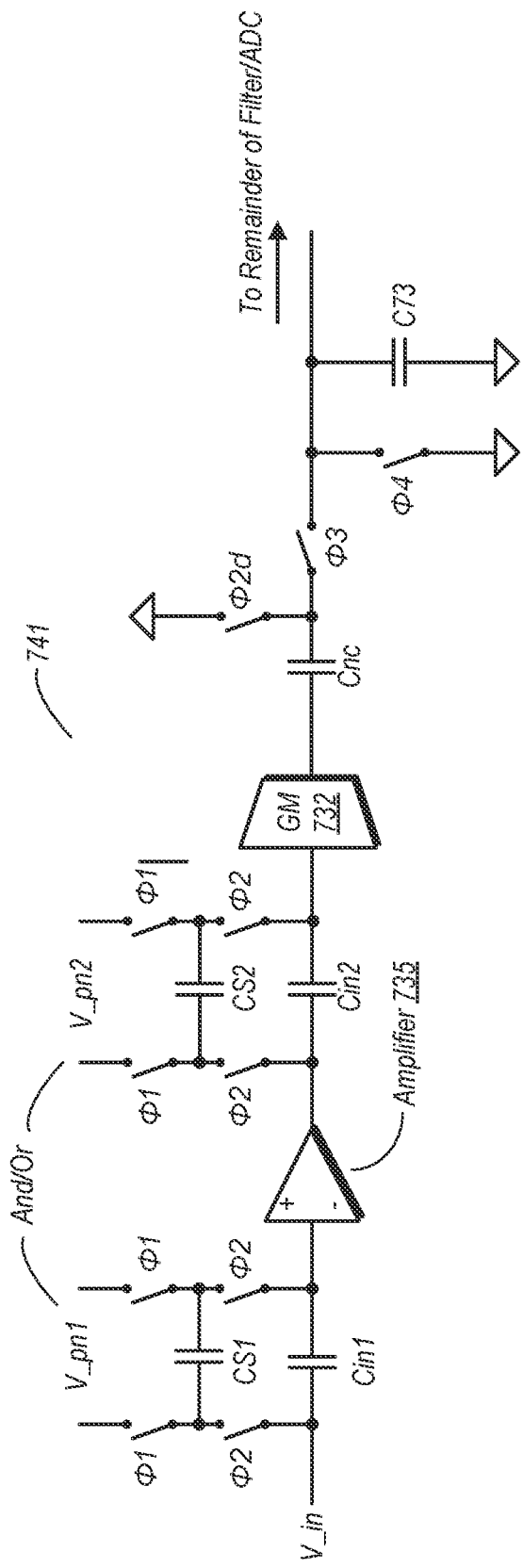
FIG. 7C is a diagram illustrating the use of another embodiment of a switched capacitor circuit to inject a test signal into another embodiment of an AFE circuit that contains a filter.

FIG. 7C is a diagram illustrating the use of another embodiment of a switched capacitor circuit to inject a test signal into another embodiment of an AFE circuit. In the embodiment shown, AFE circuit includes an amplifier 735, a transconductance amplifier 732, switched capacitor circuits for injecting test signals before and/or after amplifier 735, an optional noise canceling capacitor Cnc, as well as additional switches for charging/discharging capacitors (including capacitor C73). It is noted that, as with the other embodiments discussed above, additional instances of the circuitry shown here may be connected to form a higher-order filter.

For the filter shown in FIG. 7C, the test signal may be injected at the slow rate $f_s$ to linearize the single transconductance amplifier 732 shown based on the average filter characteristic. In higher-order filter embodiments, charge rotating may be carried out as described above. The relative timing of the clocks that operate the switches may determine the test signal injection timing. The frequency of filter capacitance switching $f_w$ may be significantly larger than the ADC sampling frequency $f_s$. The test can be injected at $f_w$ to calibrate individual filter coefficients or at $f_s$ to calibrate the overall response.

Figure 8:
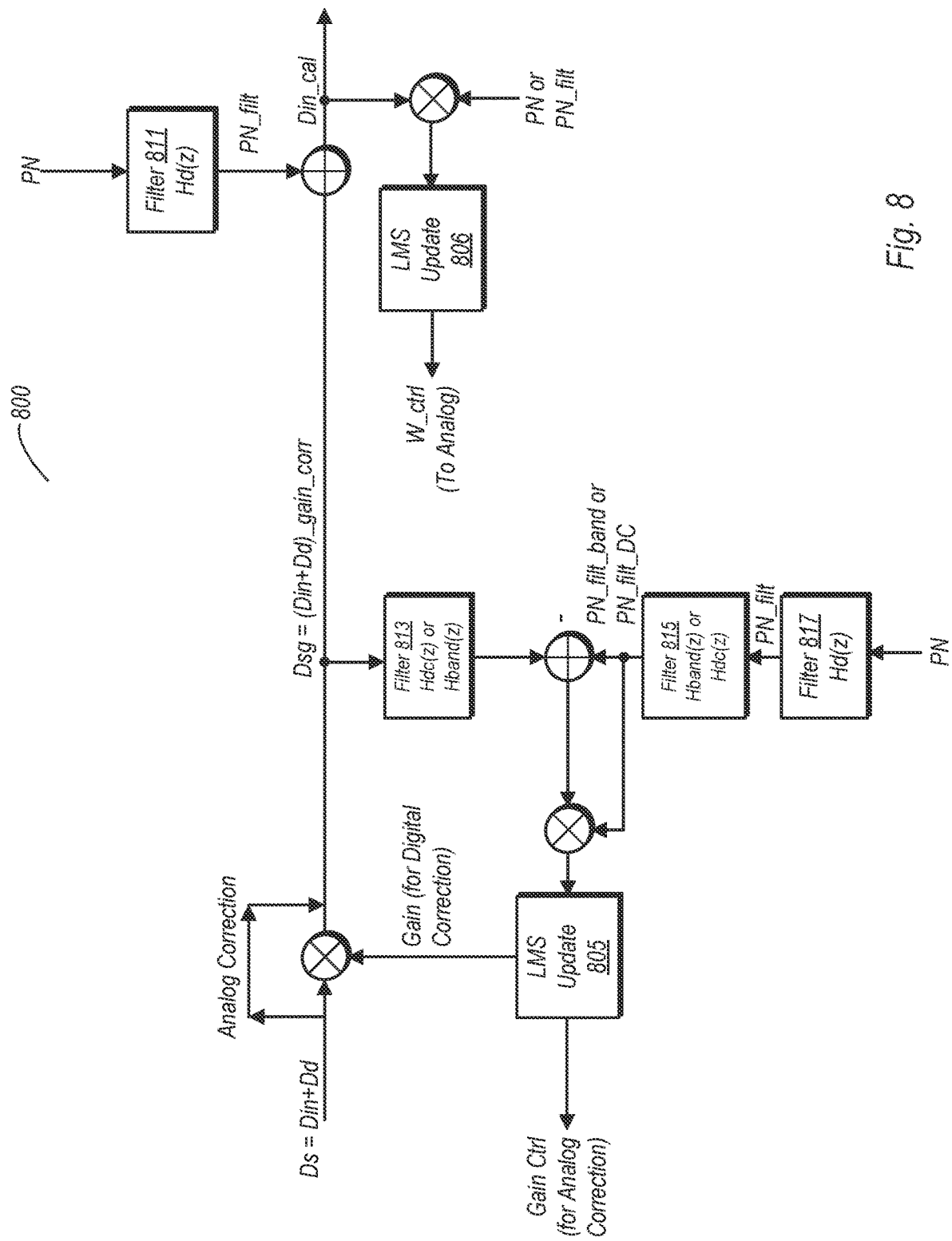
FIG. 8 is a block diagram illustrating one embodiment of a calibration technique for calibrating a DC gain and/or a band-specific gain along with a filter bandwidth.

FIG. 8 is a block diagram illustrating one embodiment of a calibration technique for calibrating a DC gain and/or a band-specific gain along with a filter bandwidth. Calibration procedure 800 in the embodiment shown includes both gain correction and filter bandwidth correction, which is carried out using various filters and least-mean squares updating. The embodiment of the procedure shown here may be carried out at least part, if not fully, in the digital domain.

In the embodiment shown, a combined signal, $D_s$ (where $D_s$=Din+Dd, the combined input signal and test signal) is used as a primary input, along with the pseudorandom sequence PN upon which the test signal is based. A gain correction factor may be added to $D_s$ to produce the signal $D_{sG}$, based on correction for non-idealities occurring in the AFE. The correction may be carried out by compensation in the digital domain (after the combined input and test signal have been converted into digital by an ADC), or in the analog domain by generating control signals that cause adjustments in the parameters of various circuits in the AFE.

Gain control signals may be generated for correction in either of the analog or digital domains by least-mean squares (LMS) updater 805, based on the input signals $D_{sG}$ and PN. The first of these inputs, $D_{sG}$, is filtered using a transfer function Hdc(z) by filter 813.

The sequence PN is filtered by filters 811 and 817, both of which have a transfer function of Hd(z). The output of filter 817, PN_filt, is subject to further filtering at DC or within a band by filter 815, which has a transfer function of Hband (z) (if filtering for a particular band) or Hdc (z) (if filtering at DC). The output of filter 815 is PN_filt_band or PN_filt_DC, depending on whether the calibration is for band-specific gain or DC gain. The value of PN_filt_band or PN_filt_DC may be subtracted from the output of filter 813, which may also filter at Hdc(z) (if filtering at DC) or Hband(z) (if filtering for a particular band), as well as mixed with this value and provided to LMS updater 805, which executes an LMS function. Based on the results, a gain correction signal is generated. This correction signal maybe fed back into the digital domain (for digital correction) or into the analog domain (for analog correction, with possible conversion of the signal to analog by a DAC).

After the correction of the combined signal $D_s$ to produce $D_{sG}$, additional calibration is performed. In particular, the PN value is filtered by filter 811 (with a transfer function of Hd(z)) to produce an instance of PN_filt, which is subtracted from $D_{sG}$ to produce the Din_cal signal. Din_cal is mixed with PN or PN_filt, with the result being provided to LMS updater 806. Based on the LMS function carried out on this result, bandwidth control (W_ctrl) signal(s) are generated to correct/control the bandwidth of an analog filter in the AFE.

Non-Linearity Calibration and Correction Procedure Block Diagrams:

The present disclosure contemplates performing calibrations to correct in-band and out-of-band non-linearities in a filter-containing AFE (e.g., in filters, amplifiers, etc.) as well as in the ADC or other circuits following the filter using the test signal injected into different locations in the AFE. Additionally, with calibrations such as this, the design on the analog side can take advantage of these calibrations by optimizing for better degradation (i.e. slope) with frequency. In some instances, this may be carried out at the expense of worse linearity at low frequencies, but such low-frequency non-linearity can be more easily calibrated out.

Figure 9A:
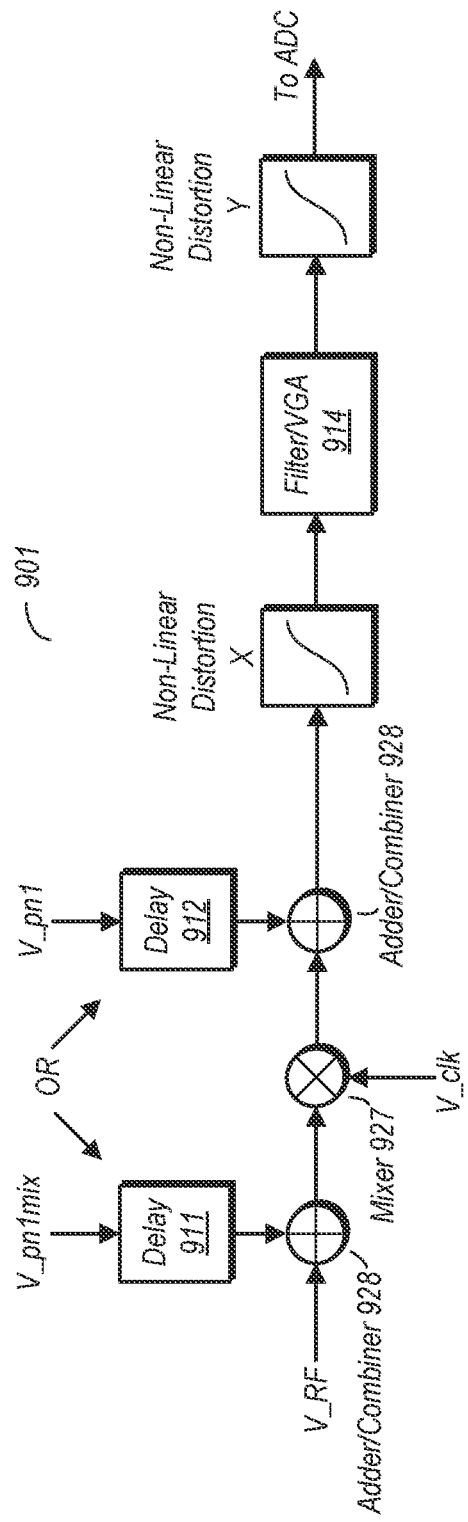
FIG. 9A is a block diagram of one embodiment of an AFE circuit illustrating test signal injection and static non-linear distortions that occur before or after a filter.

FIG. 9A illustrates one embodiment of an AFE with static non-linearity (F) preceding, or within, the filter and static non-linearity (G) following the filter. In the embodiment shown, non-linear distortion F is induced prior to or within filter/variable gain amplifier (VGA) 914. A further non-linear distortion G may occur following filter/VGA 914. A test signal, either V_pn1mix or V_pn1 is injected into the analog signal chain and combined with an input signal, V_RF, which may be used as a basis for calibrating out either of these non-linear distortions.

Figure 9B:
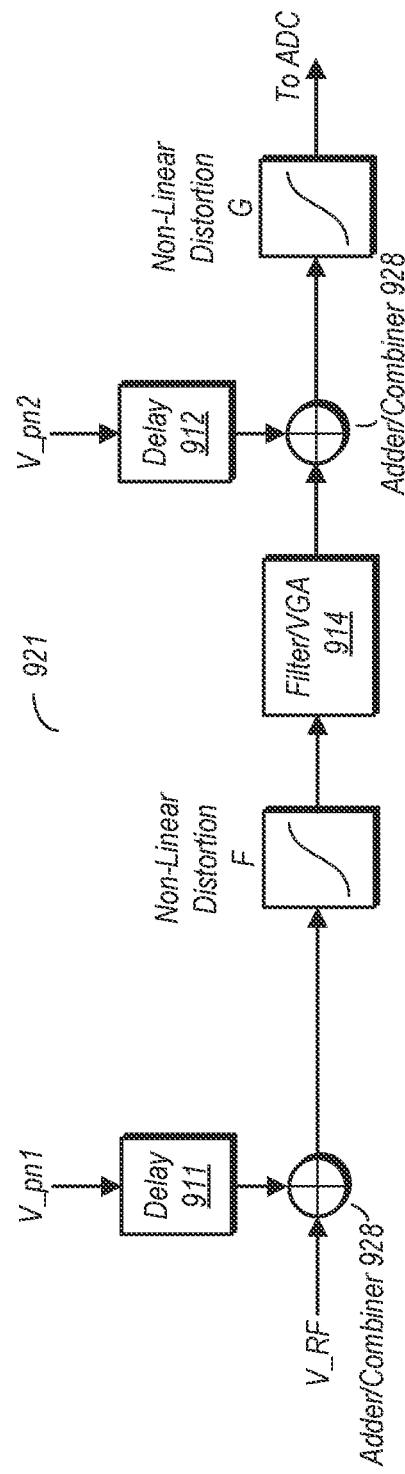
FIG. 9B is a block diagram of another embodiment of an AFE circuit illustrating uncorrelated test signal injection and static non-linear distortions in the signal path before and/or after the filter.

And alternate embodiment is shown in FIG. 9B. In this embodiment, the static non-linear distortions F and G are still present in the same areas with respect to filter/VGA 915. In this embodiment, a first test signal V_pn1 is injected and combined with V_RF prior to filter/VGA 914. This test signal may be used as a basis for calibrating out the non-linear distortion F. A second test signal, V_pn2, is injected after filter/VGA 914, and may be used as a basis for calibrating out non-linear distortion G. Thus, in this embodiment, two uncorrelated test signal injections are used to detect and calibrate both of these non-linearities.

Figure 9C:
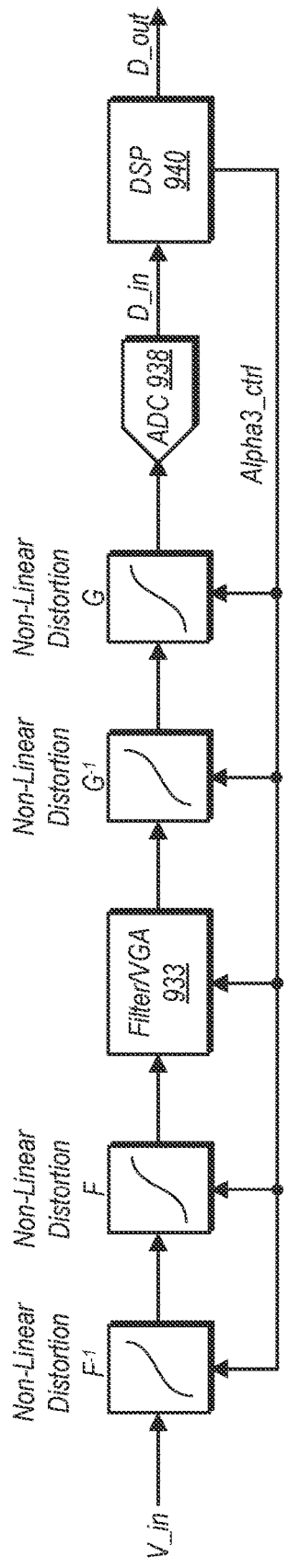
FIG. 9C is a block diagram of another embodiment of an AFE circuit illustrating cancellation of static non-linear distortion in the signal path based on calibration performed using an injected test signal.

FIG. 9C illustrates the cancellation of static non-linear distortions for one embodiment of a system 931. In the embodiment shown, non-linear distortion $F^{-1}$ is introduced into the analog signal path, which is the inverse of non-linear distortion F. Thus, the non-linear distortion $F^{-1}$ cancels out the non-linear distortion F. Similarly, another non-linear distortion $G^{-1}$ is introduced into the signal path, which is also an inverse of and cancels out the non-linear distortion G. The cancellations of the static non-linear distortions F and G are carried out in the analog domain, prior to conversion of the combined input/test signal into the digital signal D_in (by ADC 938) for input into DSP 940. The DSP 940 in the embodiment shown is configured to generate the Alpha3_ctrl signal which is fed back into the analog signal chain to carry out the cancellation of the non-linear distortions. This can be extended to more non-linearities in the AFE as shown in FIG. 14B.

Figure 9D:
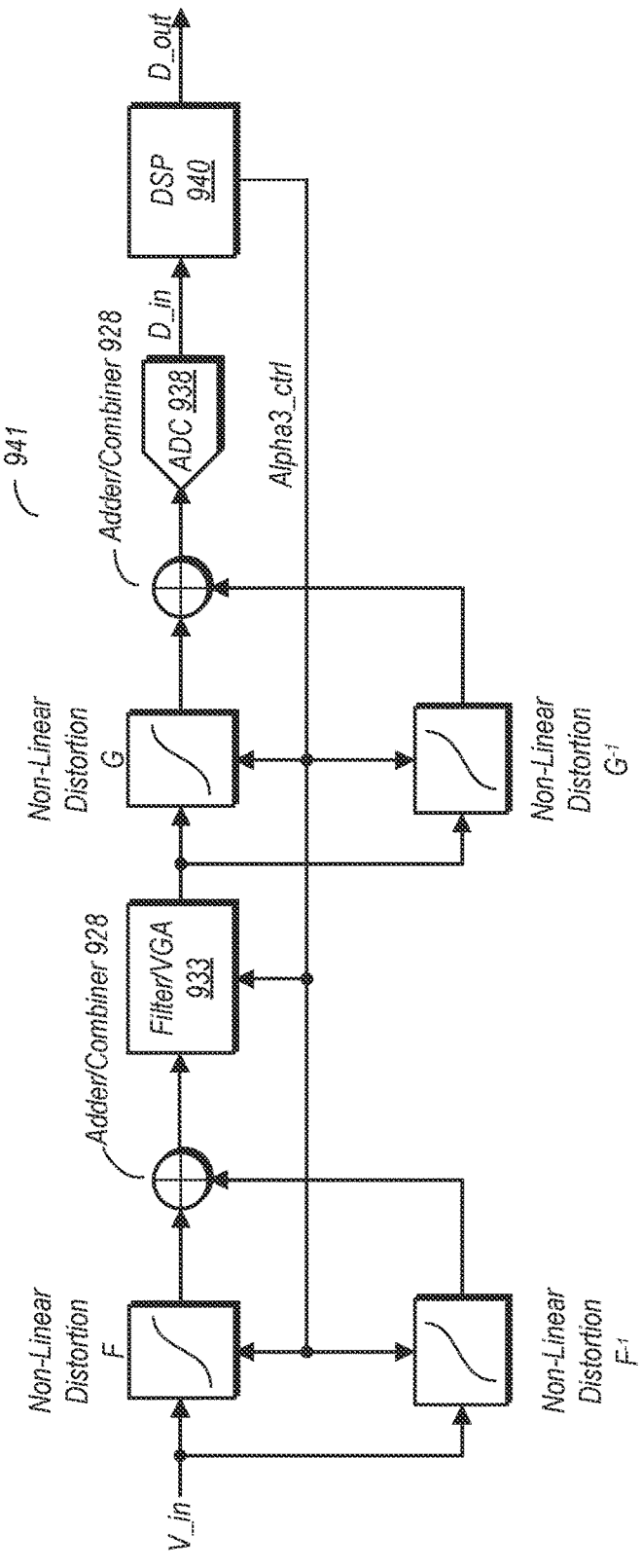
FIG. 9D is a block diagram of another embodiment of an AFE circuit illustrating cancellation of static non-linear distortion in the signal path based on calibration performed using an injected test signal.

FIG. 9D is a block diagram of another embodiment of an AFE circuit illustrating cancellation of non-linear distortion in the signal path based on calibration performed using an injected test signal. Similar to the embodiment of FIG. 9C, system 941 is subject to static non-linear distortion F prior to filter/VGA 933 as well as a second static non-linear distortion G following the filter/VGA 933. In this example, the input V_in, encounters the non-linear distortion F, but is also input, in parallel, to a block that provides an inverse distortion, non-linear distortion $F^{-1}$. The output of this block is combined with the post-distortion input signal, which with non-linear distortions F and $F^{-1}$ canceling each other out. After cancellation, the input signal passes through filter/VGA 933, where the non-linear distortion G is encountered. The signal is also input into the block where it encounters the non-linear distortion $G^{-1}$. The signals with the two non-linear distortions are then combined, which allows the cancellation of the non-linear distortion G by the signal carrying the non-linear distortion $G^{-1}$. This can be extended to more non-linearities in the AFE as shown in FIG. 14B.

Figure 10:
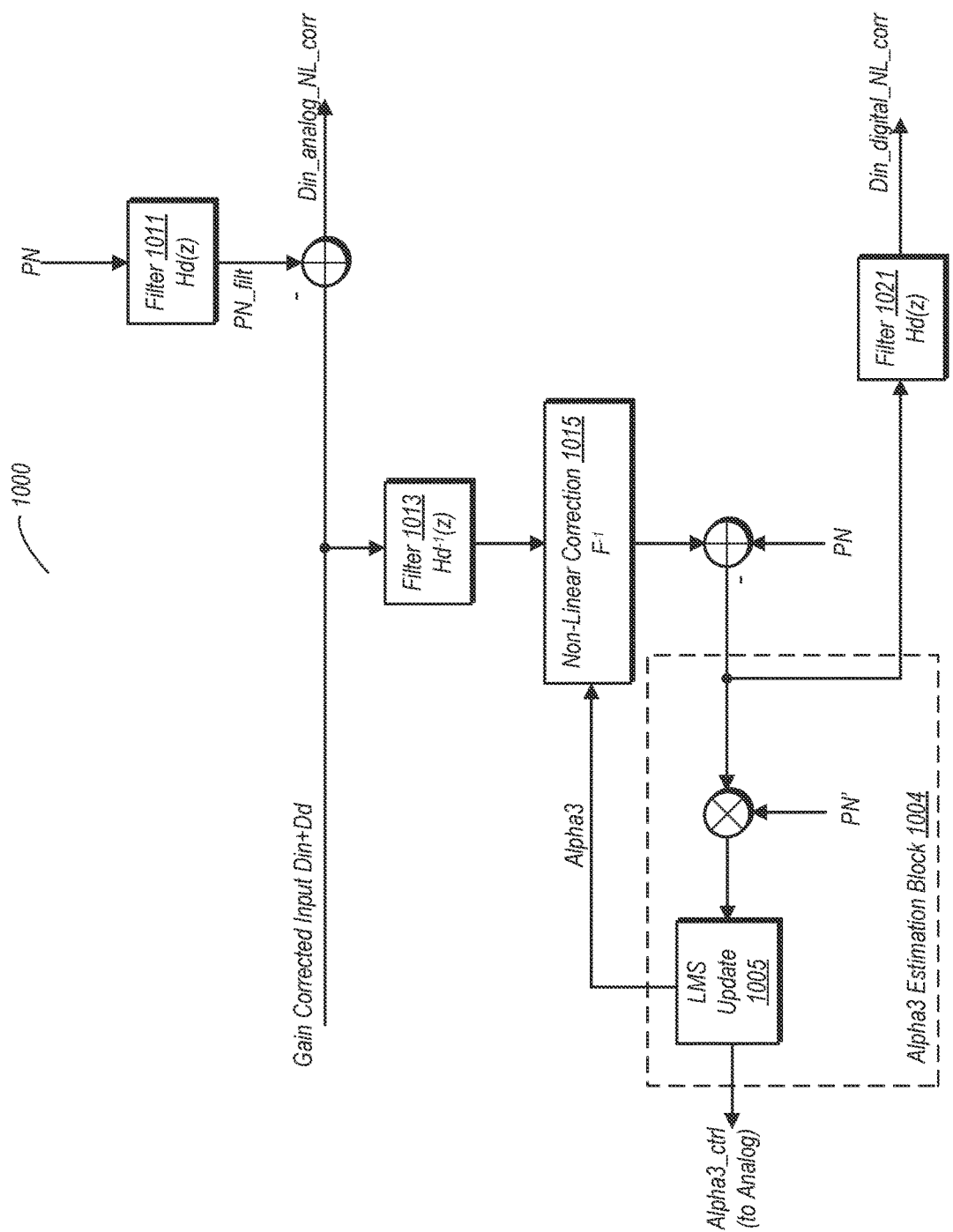
FIG. 10 is a block diagram illustrating an embodiment of a calibration technique for calibrating for static non-linearities in an embodiment of a filter.

FIG. 10 is a block diagram illustrating an embodiment of a calibration technique for calibrating for non-linearities in an embodiment of a filter. In this particular example, the static non-linearities precede the filter. The block diagram of calibration procedure 1000 illustrates the combination of filtering, inverse non-linear correction and estimation blocks. Although not explicitly shown here, this procedure may include up-sampling and/or down-sampling of signals at various points. Furthermore, this procedure is agnostic as to how the actual non-linear parameter estimation is done. The correction for the non-linear distortion can be carried out in the digital domain using the value Alpha3, or in the analog domain by feeding back the control signal(s) Alpha3_ctrl to adjust cancelling non-linearities as shown above in FIGS. 9C and 9D.

Calibration procedure 1000 includes receiving the digital value Din+Dd, which corresponds to the combined analog input signal and analog test signal that is converted into the digital domain by an ADC and can be gain-corrected as described above. This digital value is filtered in the digital domain using filter 1013. This filter implements an inverse transfer function, $Hd^{-1}(z)$, with respect to the analog filter, whose transfer function if transformed into the digital domain is Hd(z). Up-sampling (interpolation) may be employed to ensure the effectiveness of the inverse filtering over the entire frequency range of interest. The output of filter 1013 is to a non-linear correction block 1015, $F^{-1}$. The value PN (a sum of 3 dither bits) is then subtracted from the output of linear correction block 1015. After subtraction, the resulting value may be filtered with the digital transformation of the analog filter, Hd(z), by filter 1021, to generate a digital correction value, Din_digital_NL_corr. Additionally, after subtraction, the resulting value is also mixed with the value PN' (a product of the 3 dither bits), with the result being applied to a least-mean squares function in block 1005 in Alpha3 estimation block 1004. LMS updater then generates either the Alpha3_ctrl signal, which may be used to control the non-linear distortion cancellation in the analog domain, or the Alpha3 signal fed to non-linear correction block 1015 to cancel the non-linear distortion in the digital domain. Additionally, the pseudorandom sequence is filters by the transformation of the analog filter transfer function, Hd(z), to produce the PN_filt value, which is subtracted from Din+Dd to generated the Din_analog_NL_corr value.

Figure 11:
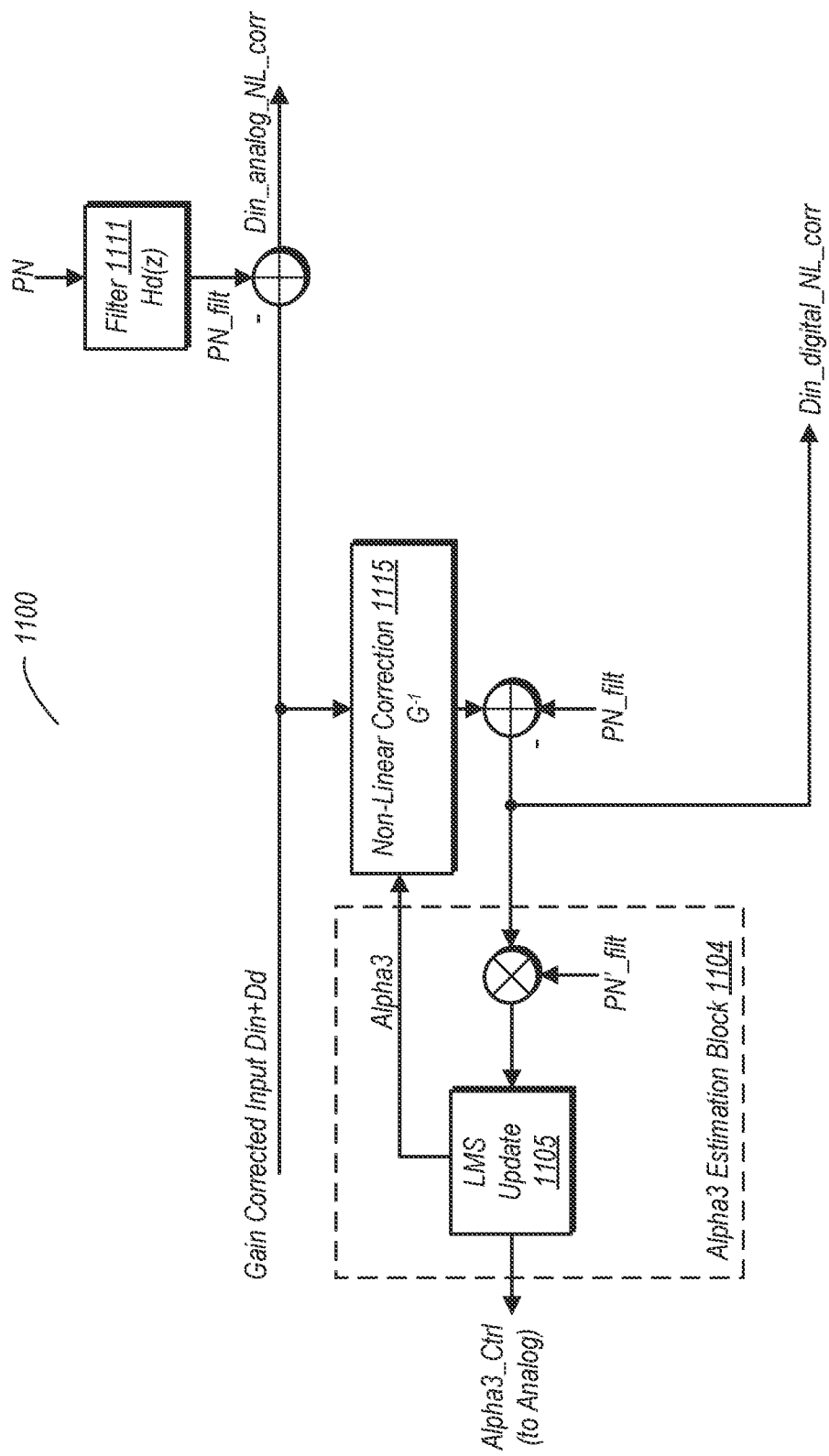
FIG. 11 is a block diagram illustrating an embodiment of a calibration technique for calibrating for a static non-linearity after the filter in one embodiment of an AFE circuit.

FIG. 11 is a block diagram illustrating an embodiment of a calibration technique for calibrating for a static non-linearity after the filter using dither injected before the filter in one embodiment of an AFE circuit. More particularly, the static non-linearity after the filter may be canceled based only on signals injected prior to the filter. Procedure 1100 involves a combination of filtering, inverse non-linear correction and estimation. Up-sampling or down-sampling may be utilized if needed, while the procedure is agnostic as to how the actual non-linear parameter estimation is carried out. The correction to the non-linear distortions can be carried out in the digital domain using Alpha3, or in the analog domain by feeding back the parameter Alpha3_ctrl to adjust a cancelling non-linearity as shown in FIGS. 9C and 9D.

In the embodiment shown, procedure 1100 includes the generation of a filtered value PN_filt by inputting the unfiltered value PN into filter 1111 (which has a transfer function of Hd(z)). This transfer function is a transformation that corresponds to the transfer function of the analog filter. The digital value of the combined input and test signal, Din+Dd that is converted by an ADC into the digital domain, is subtracted from the PN_filt value to generate the Din_analog_NL_corr value. The Din+Dd value is also input directed into the non-linear correction function 1115, with the resulting output having the value of PN_filt subtracted therefrom, or Din_digital_NL_corr. This value is then mixed with the value PN_filt, and applied to LMS updater 1105. From there, either the Alpha3_ctrl value or the Alpha 3 value is generated and forwarded as also carried out in the embodiment shown in FIG. 10.

The two examples given above, with respect to FIGS. 10 and 11, are examples of non-linearity estimation performed with multiple dither signals/pseudorandom sequences. The estimation of non-linearity for the example of FIG. 10 is given by the following equation:

$$\alpha_3(n+1)=\alpha_3(n)-\mu(PN')(F^{-1}(h_d^{-1}*D_s)-PN) \quad (12),$$

where the parameter PN is the sum of 3 dither bits and PN' is their product.

For non-linear distortion that follows the filters, such as that corrected by the procedure illustrated in FIG. 11, the equation is as follows:

$$\alpha_3(n+1)=\alpha_3(n)-\mu(h_d*PN')(G^{-1}(D_s)-h_d*PN) \quad (13).$$

If the dither (test signal) is injected after the filter (e.g., as in FIG. 9B), the non-linear estimation may be given by:

$$\alpha_3(n+1)=\alpha_3(n)-\mu(PN2')(G^{-1}(D_s)-PN2) \quad (14).$$

For pure, third order distortion, the correction function can be given by:

$$F^{-1}(x)=x+\alpha_3 x^3 \quad (15).$$

The corrected digital output may be given by:

$$D_{nonlincorr}=(F^{-1}(h_d^{-1}*D_s)-PN)*h_d \quad (16).$$

For non-linear distortion that follows the filter, as corrected by the procedure of FIG. 11, the corrected output may be given by:

$$D_{nonlincorr}=(G^{-1}(D_s)-PN*h_d) \quad (17a).$$

If the injection of the test signal is carried out after the filter, e.g., as shown in FIG. 9B, the calibration of the non-linearity following the filter does not require filtering, and can be given by:

$$D_{nonlincorr}=(G^{-1}(D_s)-PN2) \quad (17b).$$

The embodiments of the procedures depicted by the block diagrams of FIGS. 10 and 11 deal with the transfer function of the filter, the dither and non-linearity estimation to estimate and calibrate the filtered and distorted output in a unique way in how they deal with the filter response and extract the static nonlinearity before, within and after the filter. This may ensure accurate estimation of the nonlinearity for both in-band and out-of-band signals, and is agnostic with regard to the specific way used for estimating the non-linearity factor (Alpha3) shown in the Alpha3 estimation blocks of those particular drawings. Other ways, such as a statistical approach or any other suitable method can be used to estimate the non-linearity within the same framework of FIG. 10.

Figure 12:
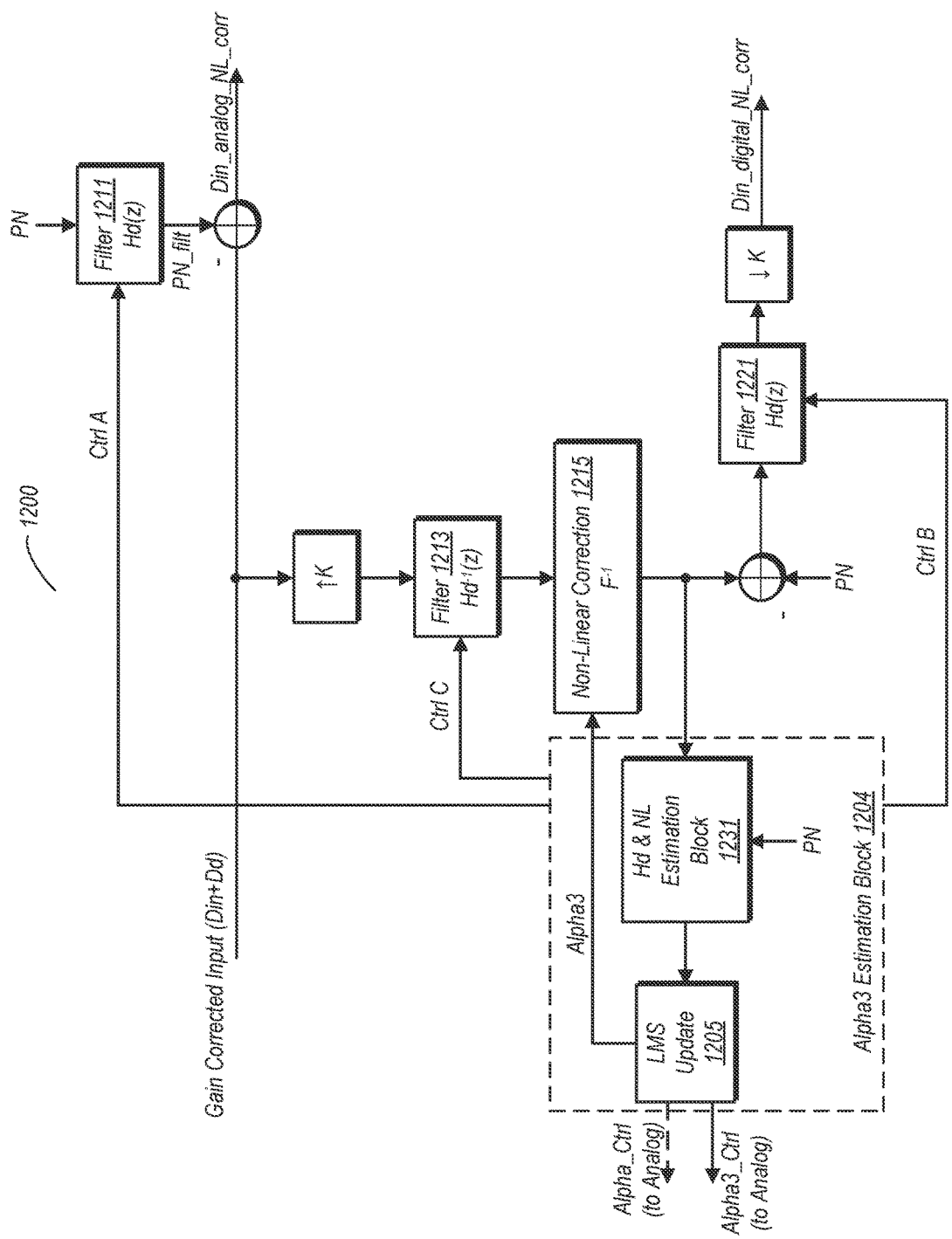
FIG. 12 is a block diagram illustrating an embodiment of a calibration technique for calibrating, using a test signal injected prior to a filter, for a static non-linearity occurring prior to or within the filter in one embodiment of an AFE circuit.

FIG. 12 is a block diagram illustrating an embodiment of a calibration technique for calibrating, using a test signal injected prior to a filter, for a non-linearity occurring prior to or within the filter in one embodiment of an AFE circuit. The embodiment of calibration procedure 1200 depicted in FIG. 12 includes a combination of filtering, inverse non-linear correction and estimation blocks. Up-sampling or down-sampling may be employed if needed. The procedure is agnostic as to how the actual non-linear parameter estimation is done. In addition to the non-linear calibration, the procedure can concurrently calibrate the filter transfer function using one of the techniques disclosed herein. Also shown is interpolation (up-sampling) by the factor k that is employed to ensure that the sample rate is high enough for the out-of-band linearization. This up-sampling is cancelled by decimation on the output by the same factor k. The correction can be done in the digital domain using Alpha3, or in the analog domain by feeding back the parameter alpha3_ctrl to adjust a cancelling non-linearity as shown in FIGS. 9C and 9D.

In the embodiment shown, the dither bits of the pseudo-random sequence PN are applied to filter 1211, which has a transfer function Hd(z), to produce PN_filt. This value is subtracted from the digital value Din+Dd to produce Din_analog_NL_corrr. The digital value Din+Dd is also up-sampled by a factor K. The up-sampled signal is provided to filter 1213, which has a transfer function Hd-1 (z), which is the inverse of that of filter 1211. The filtered, up-sampled signal is then provided to non-linear correction block 1215. The output of non-linear correction block 1215 is provided to two different destinations. The first is Hd & NL estimation block 1231, which performs filter estimation for the filter in the AFE using the z-transformation of the desired filter impulse response (for example gain and bandwidth as described before), as well as estimation of non-linear distortion. The output of block 1231 is provided to LMS updater 1205, which uses a least-mean squares to generate either Alpha_Ctrl to correct the gain or bandwidth in the analog domain as described before, Alpha3_Ctrl signal provided to the analog domain to correct the non-linear distortion, the signals Ctrl B/C to correct the gain and/or bandwidth of the filter in the digital domain as described before, or the Alpha 3 signal that is used to correct the non-linearities in the digital domain. Calibration procedure is agnostic as to how the actual non-linear parameter estimation is carried out inside block 1204. In addition to the non-linear calibration, the procedure may concurrently calibrate the filter transfer function using one of the techniques disclosed elsewhere herein. The output of the non-linear correction block 1215 is also has the dither bits of the pseudorandom sequence PN subtracted therefrom with the difference being provided to filter 1221, which has a transfer function of Hd(z) (the same as filter 1211). The output of filter 1221 is down-sampled by a factor of K, with the resulting output being Din_digital_NL corr.

For the FIR filter shown in FIG. 7B, a linearization algorithm can be employed for multiple instances of transconductance amplifier 722 (e.g., coupled in parallel) by binning the processing (correlation) based on the instance being used and the corresponding test signal. The test signal can be applied to specific instances of the multiple transconductance amplifier in a round robin fashion, or can be applied to all instance at the fast rate $f_w$, and binned for each instance separately at the slower rate, $f_s$. In this manner, the processing may be carried out at a decimated rate.

Figure 13:
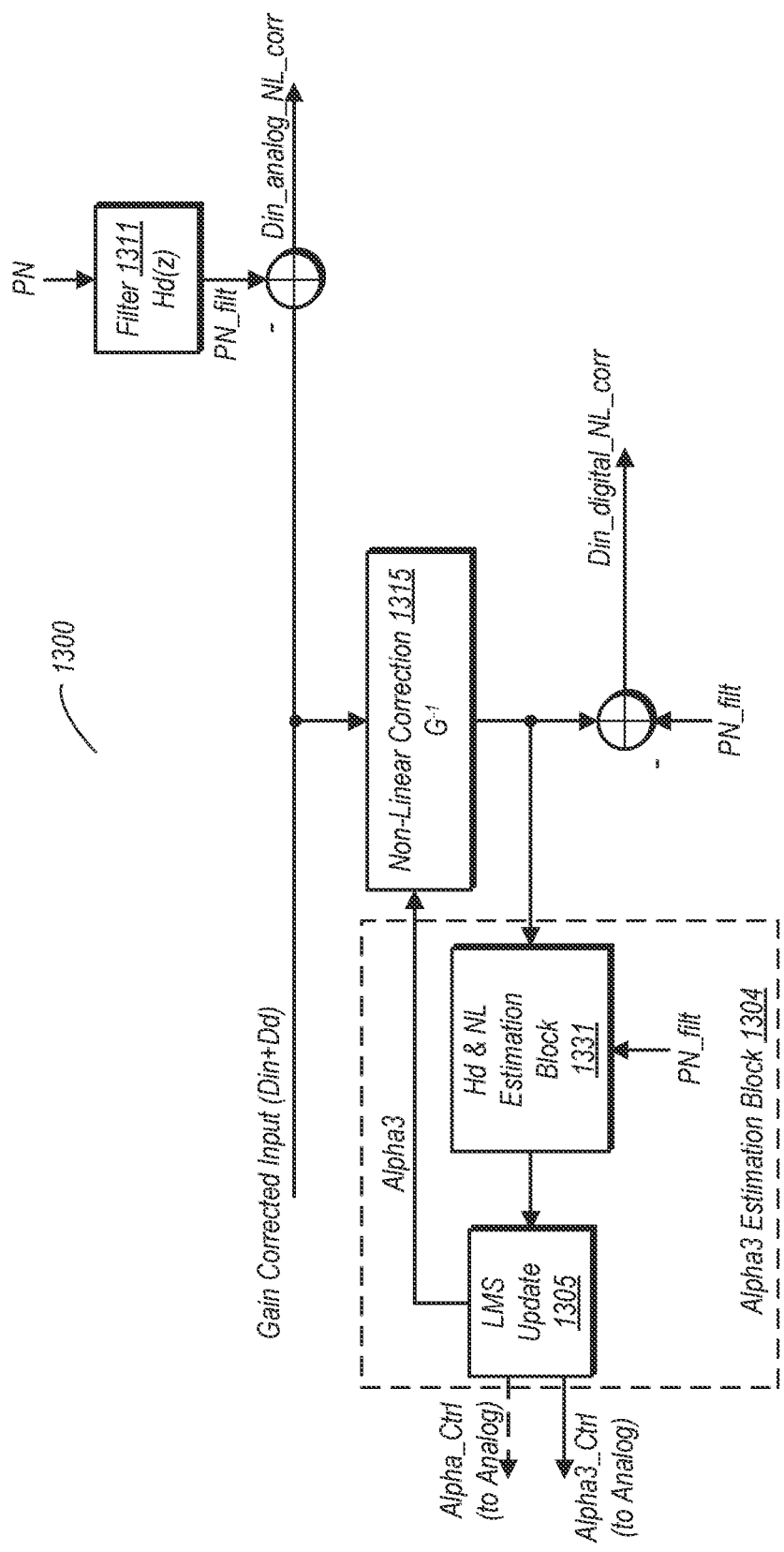
FIG. 13 is a block diagram illustrating an embodiment of a calibration technique for calibrating for a static non-linearity that occurs after a filter using a test signal injected before the filter in one embodiment of an AFE circuit.

FIG. 13 is a block diagram illustrating an embodiment of a calibration technique for calibrating for a static non-linearity that occurs after a filter using a test signal injected before the filter in one embodiment of an AFE circuit. Calibration procedure 1300 in the embodiment shown includes a combination of filtering, inverse non-linear correction and estimation blocks is patentable. Although not depicted in the drawing of this embodiment, up-sampling and down-sampling may be utilized if needed. This procedure is agnostic as to how the actual non-linear parameter estimation is carried out. In addition to the non-linear calibration, the algorithm can concurrently calibrate the filter transfer function using one of the techniques discussed elsewhere in this disclosure. The correction can be carried out in the digital domain using Alpha3, or in the analog domain by feeding back the parameter Alpha3_ctrl to adjust a cancelling non-linearity such as those illustrated in FIGS. 9A and 9B.

In the embodiment shown, the Din+Dd signal is applied directly to the non-linear correction block 1315. The output is applied to Hd & NL estimation block 1331, which is also coupled to receive the filtered dither bits (as output from filter 1311). Based on these two inputs, block 1311 performs filter estimation for the filter in the AFE using the z-transformation of the desired filter impulse response, as well as estimation of non-linear distortion. The output of this block is forwarded to LMS updater 1305, where a least-mean squares function is applied. This results in generation of either an Alpha 3 signal that is fed back to block 1315 for non-linear correction in the digital domain, or the Apha_Ctrl and Alpha3_Ctrl signals for non-linear correction in the analog domain. The output of block 1315 is also has the dither bits of the pseudorandom sequence subtracted therefrom to generate the Din_digital_NL_corr value.

Figure 14A:
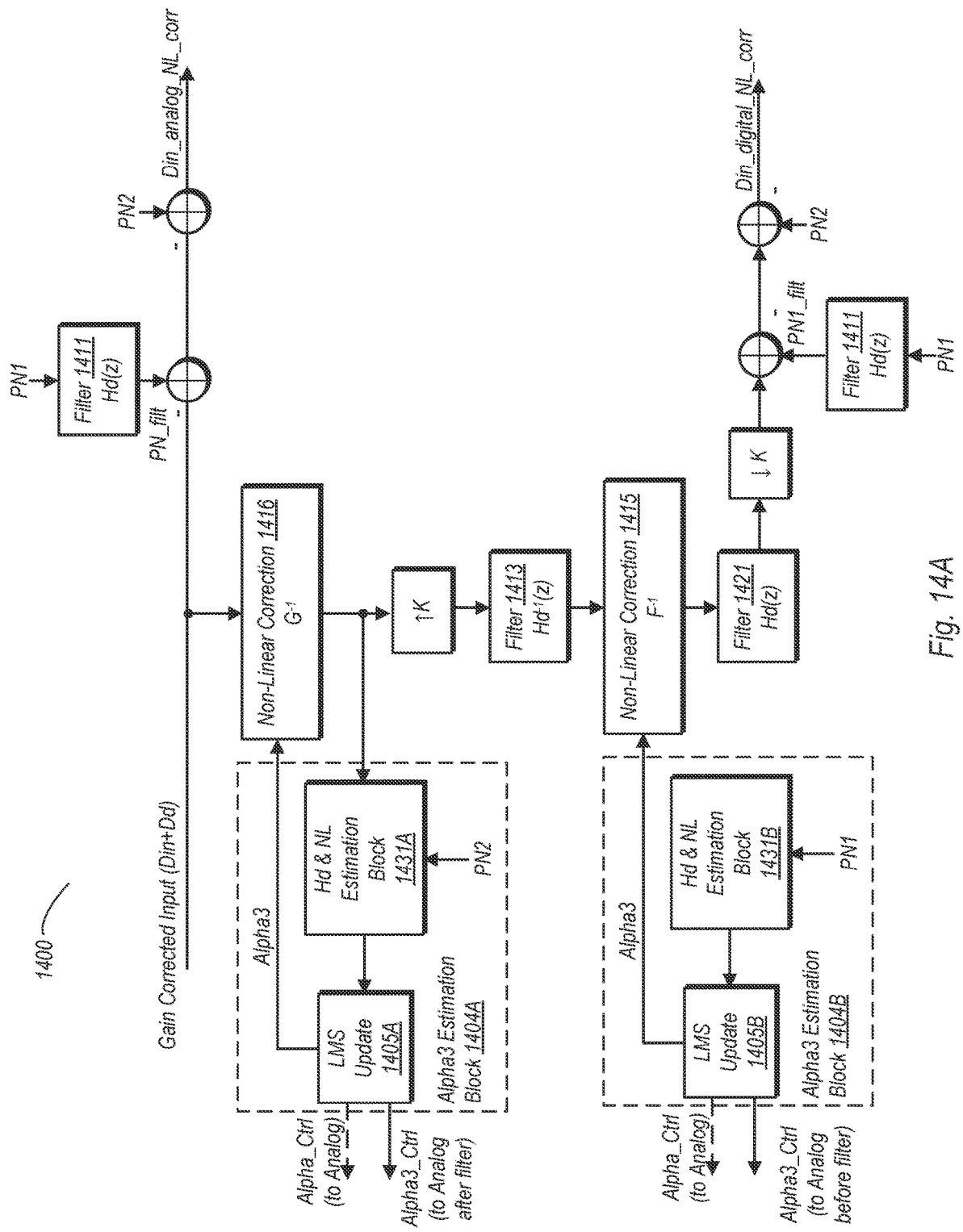
FIG. 14A is a block diagram illustrating another embodiment of a calibration technique for calibrating for static non-linearities occurring prior to the filter and after the filter of one embodiment of an AFE circuit, with uncorrelated test signals being injected before and after the filter.
Figure 14B:
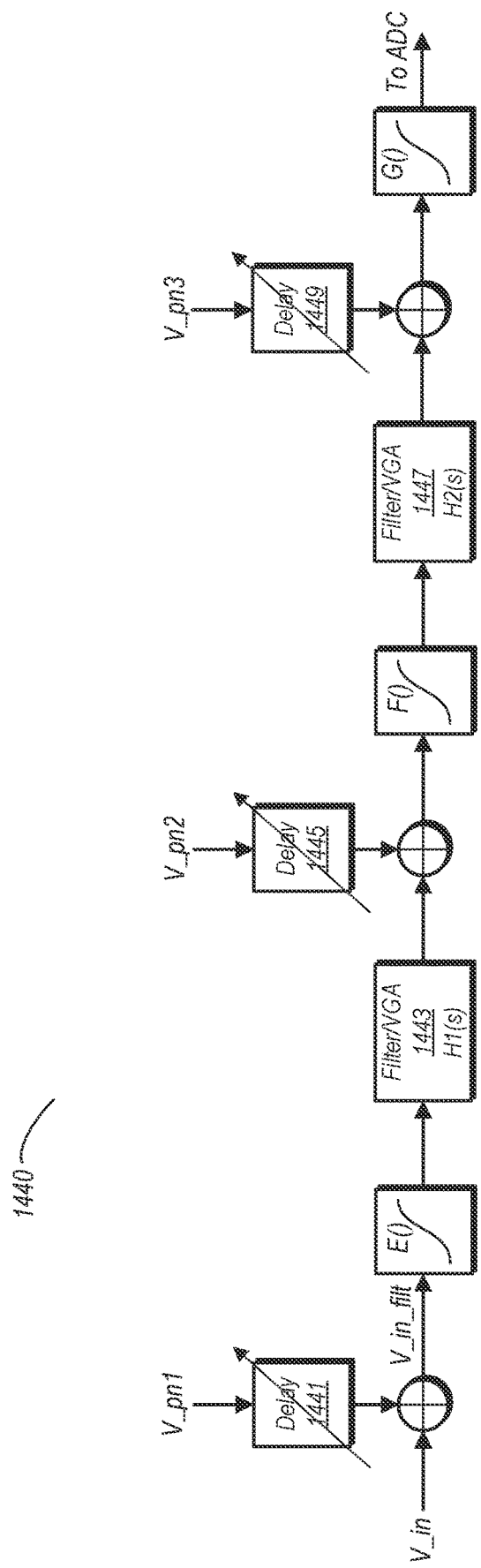
FIG. 14B is a block diagram of another embodiment of an AFE circuit illustrating test signal injection and static non-linear distortions in the signal path before and/or after the filters. In this case, two filtering stages are shown with 3 uncorrelated dither signal injections at different points before and after the filters.

FIG. 14A is a block diagram illustrating another embodiment of a calibration technique for calibrating for static non-linearities occurring prior to the filter and after the filter of one embodiment of an AFE circuit, with test signals being injected before and after the filter. Calibration procedure 1400 as shown in FIG. 14 combines the calibration procedures shown in FIGS. 12 and 13. Descriptions of the operations of calibration procedures 1200 and 1300 apply to their corresponding section in calibration procedure 1400.

In this embodiment, two different uncorrelated dither injections are used, before and after filter (PN1 and PN2 respectively), similar to that shown in FIG. 9B. Up-sampling and down-sampling by a factor of K is also performed. The correction can be done in the digital domain using Alpha3, or in the analog domain by feeding back the parameter Alpha3_ctrl to adjust a cancelling nonlinearity, as shown in FIGS. 9C and 9D. Alpha3 estimation block 1404A in the embodiment shown adjusts the canceling non-linearity that occurs after the filter. Alpha3 estimation block 1404B in the embodiment shown adjusts that canceling non-linearity that occurs before the filter.

This is an effective method to linearize different non-linearities that encounter different filter transfer functions. This can be extended to cases where there is a cascade of more than one filter. In this case, the injection of multiple uncorrelated dither signals before the various non-linear filters with transfer functions (Hd1(z), Hd2(z), etc.) as shown in FIG. 14B can effectively detect and correct the non-linearity in the various sections of the AFE, where the filtering employed for each dither signal represents the transfer function that each dither encounters. Therefore, linearization can occur to the multiple stages back to front as shown in FIG. 14C for more than 2 non-linearities.

Figure 14C:
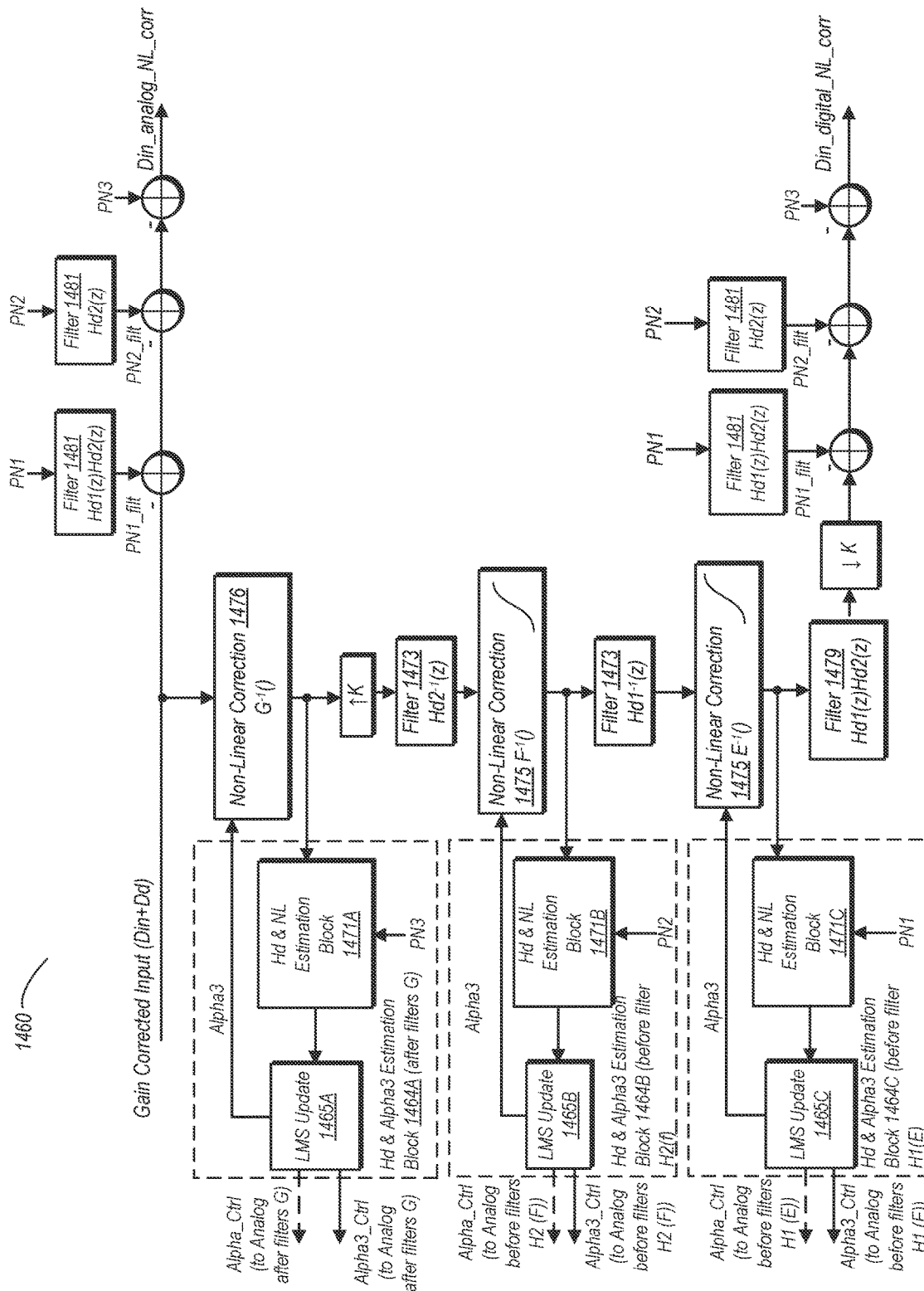
FIG. 14C is a block diagram illustrating another embodiment of a calibration technique for calibrating for static non-linearities occurring prior to the filters and after the filters of one embodiment of an AFE circuit, with uncorrelated test signals being injected before and after the filters. In this case, two filtering stages are shown.

FIG. 14C extends the calibration approach to multiple filter stages as shown in FIG. 14B. Using multiple dither injections, each dither is filtered by the appropriate filter transfer function and the correction is performed back to front. The correction of the static non-linearity after the filters (G) can be performed in the digital or analog domains, while the correction of the filtered static non-linearities is performed in the analog domain in this case.

Figure 15A:
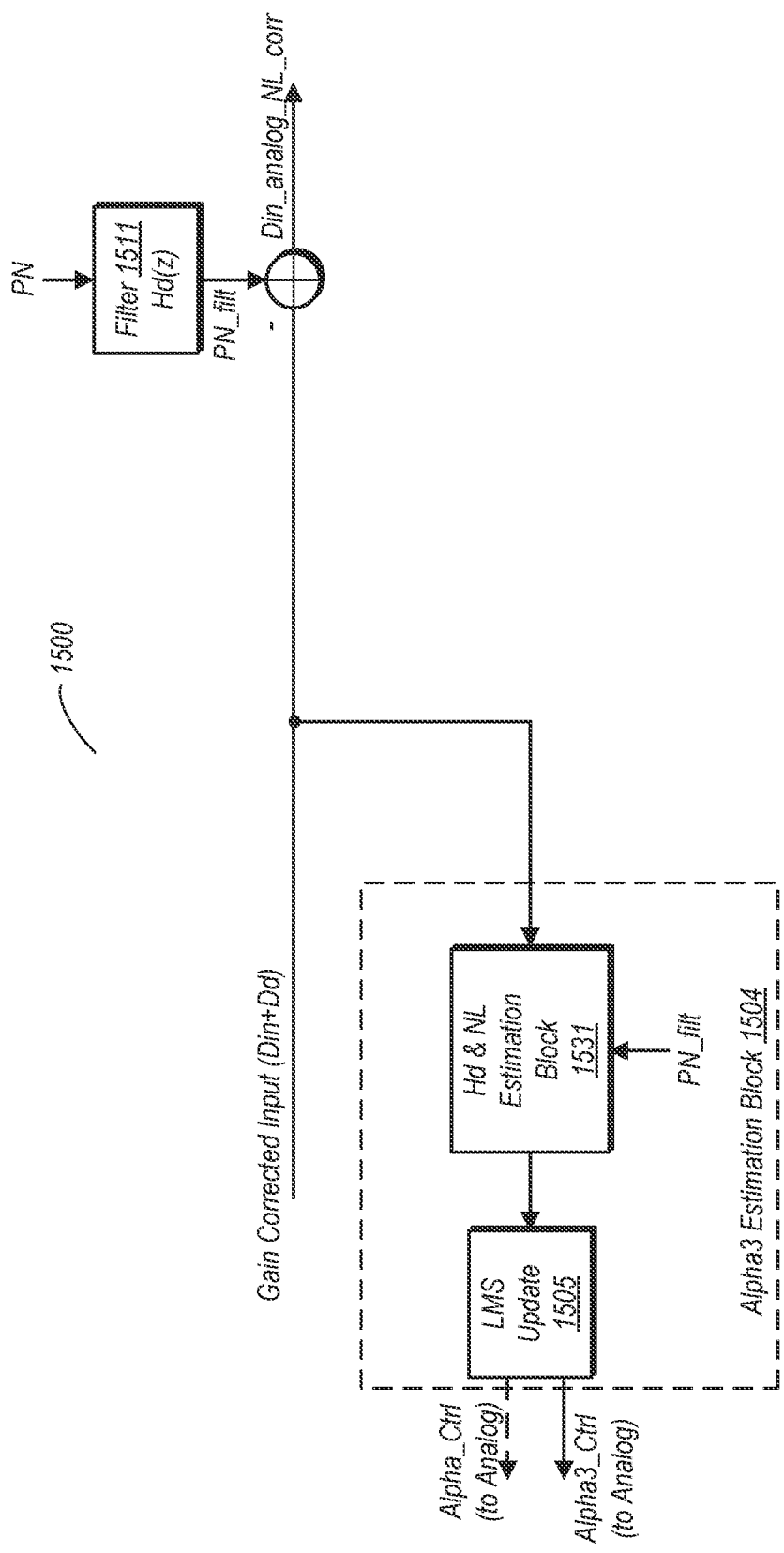
FIG. 15A is a block diagram illustrating an embodiment of a calibration technique for calibrating, using a test signal injected prior to a filter, for a static non-linearity occurring prior to or within the filter in another embodiment of an AFE circuit.

FIG. 15A is a block diagram illustrating an embodiment of a calibration technique for calibrating, using a test signal injected prior to a filter, for a non-linearity occurring prior to or within the filter in another embodiment of an AFE circuit. The embodiment shown, calibration technique contemplates a calibration in which the correction to non-linearities is performed solely in the analog domain using a simplified procedure. No inverse filtering is carried out in this particular embodiment. The 3-dither approach described in equations (13) and (14) can be used. The estimation for analog calibration in this case can be represented as follows:

$$\alpha_{3\_ctrl}(n+1) = \alpha_{3\_ctrl}(n) - \mu(h_d^*PN')(D_s - h_d^*PN) \quad (18)$$

where PN is the sums of the three dither bits and PN' is their product.

Figure 15B:
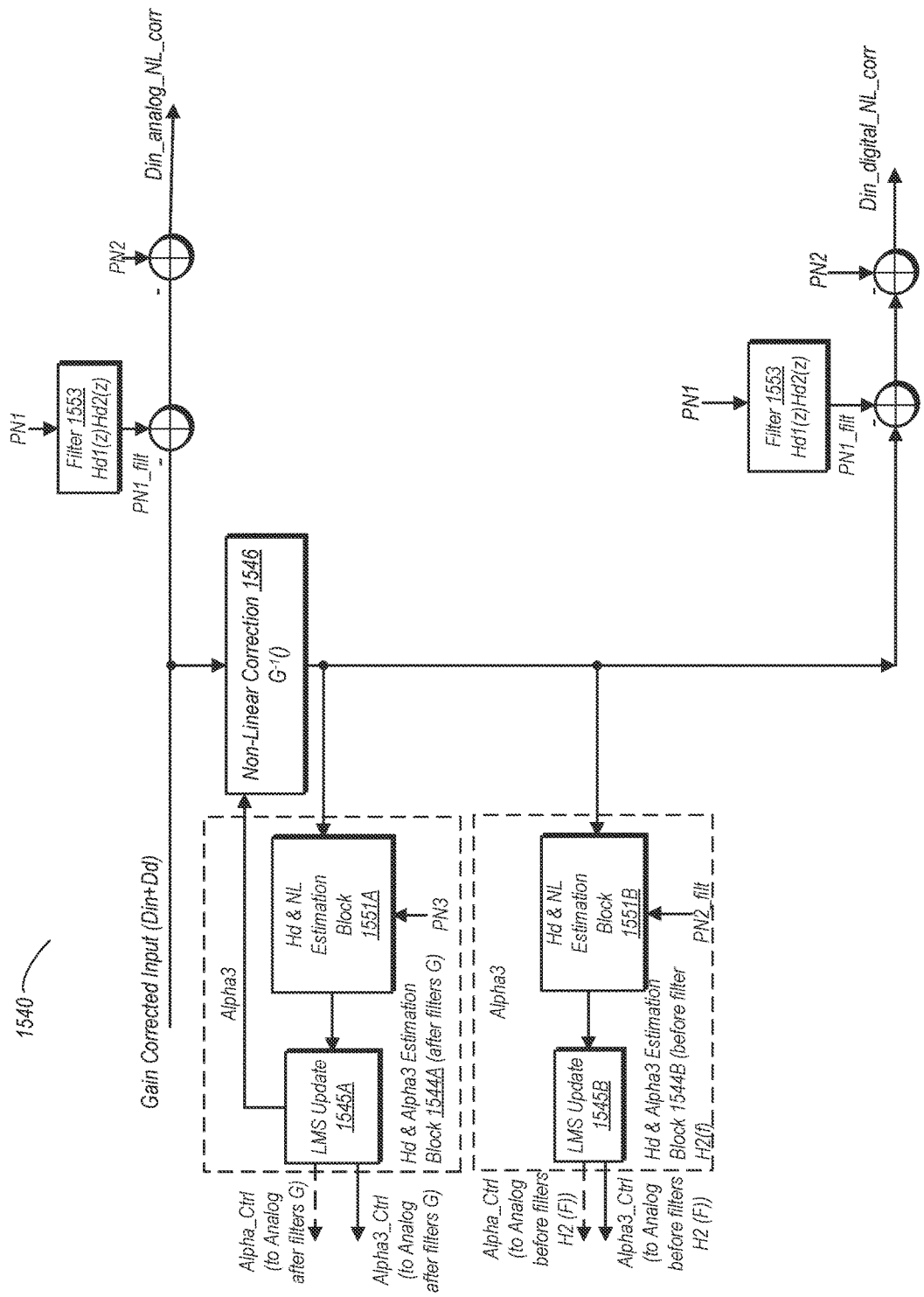
FIG. 15B is a block diagram illustrating another embodiment of a calibration technique for calibrating for static non-linearities occurring prior to the filter and after the filter of one embodiment of an AFE circuit, with uncorrelated test signals being injected before and after the filter.

FIG. 15B is a block diagram illustrating a calibration technique for calibrating, using a test signal injected prior to a filter, for a non-linearity occurring prior to or within the filter and another uncorrelated test signal injected after the filter for a non-linearity occurring after the filter in another embodiment of an AFE circuit. The embodiment shown, calibration technique contemplates a calibration in which the correction to non-linearities is performed solely in the analog domain using a simplified procedure for the non-linearity occurring before the filter, and the correction is done in the analog or digital domain for the non-linearity occurring after the filter. No inverse filtering is carried out in this particular embodiment. The 3-dither approach described in equations (14) and (18) can be used for the unfiltered non-linearity (G) and the filtered non-linearity (F) respectively as follows:

$$\alpha_{3\_ctrl\_G}(n+1) = \alpha_{3\_ctrl\_G}(n) - \mu(PN2')(G^{-1}(D_s) - PN2) \quad (19)$$

$$\alpha_{3\_ctrl\_F}(n+1)=\alpha_{3\_ctrl\_F}(n)-\mu(h_d*PN1')(G^{-1}(D_s)-h_d*PN1) \quad (20)$$

Figure 15C:
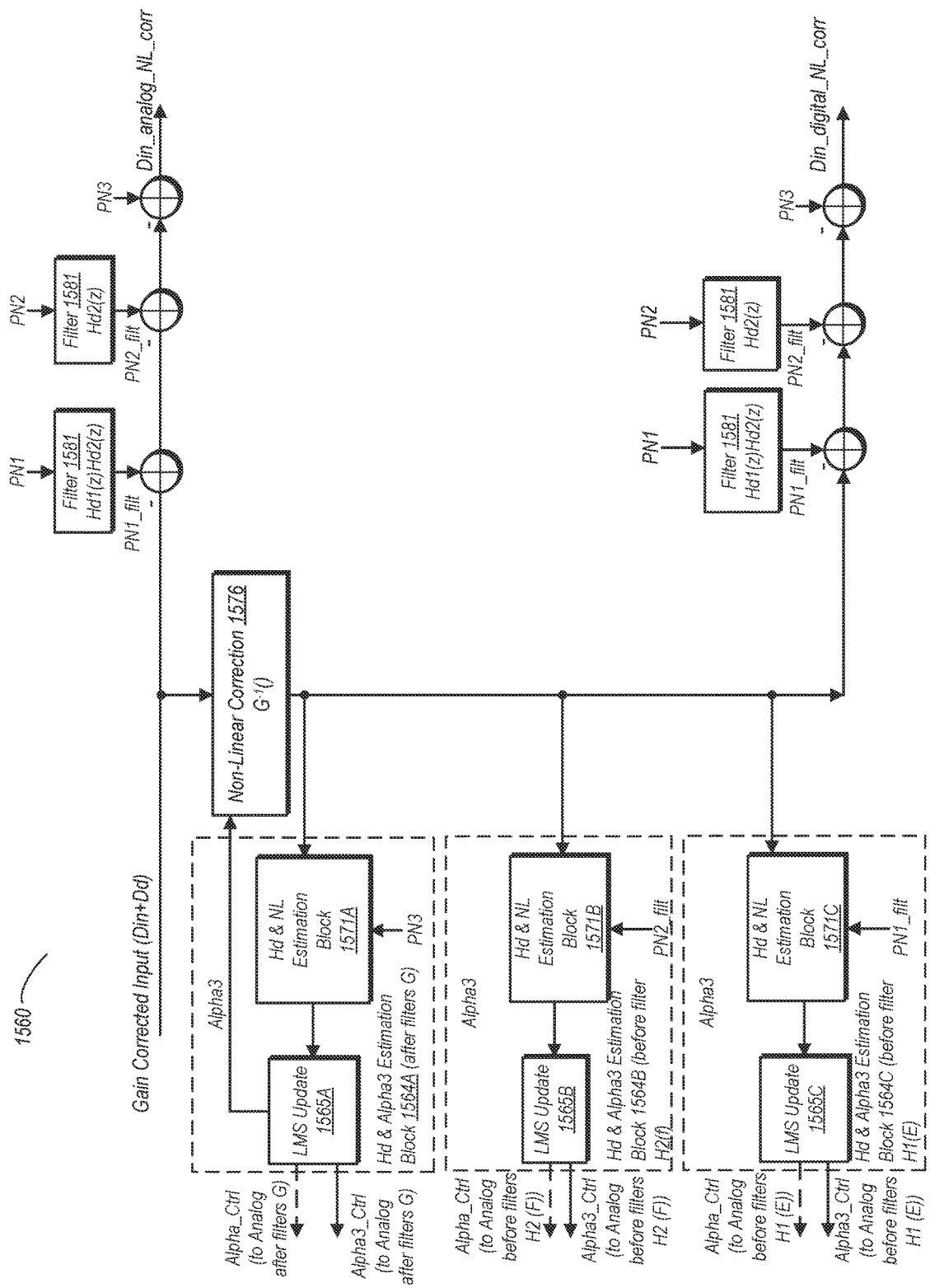
FIG. 15C is a block diagram illustrating another embodiment of a calibration technique for calibrating for static non-linearities occurring prior to the filters and after the filters of one embodiment of an AFE circuit, with uncorrelated test signals being injected before and after the filters. In this case, two filtering stages are shown.

FIG. 15C extends the analog correction approach to multiple filter stages as shown in FIG. 14B. Using multiple dither injections, each dither is filtered by the appropriate filter transfer function and the correction is performed back to front. The correction of the static non-linearity after the filters (G) can be performed in the digital or analog domains, while the correction of the filtered static non-linearities (F and E) is performed in the analog domain in this case using controls $\alpha_{3\_ctrl\_F}$ and $\alpha_{3\_ctrl\_E}$.

$$\alpha_{3\_ctrl\_G}(n+1)=\alpha_{3\_ctrl\_G}(n)-\mu(PN3')(G^{-1}(D_s)-PN3) \quad (21)$$

$$\alpha_{3\_ctrl\_F}(n+1)=\alpha_{3\_ctrl\_F}(n)-\mu(h_{d2}*PN2')(G^{-1}(D_s)-h_{d2}*PN2) \quad (22)$$

and $$\alpha_{3\_ctrl\_E}(n+1)=\alpha_{3\_ctrl\_E}(n)-\mu(h_{d1}*h_{d2}*PN1')(G^{-1}(D_s)-h_{d1}*h_{d2}*PN1) \quad (23)$$

Although the disclosure is focused on third order non-linearity, other orders can be calibrated as well. This may be carried out by modifying the non-linearity estimation block to detect other orders of non-linear errors. For example, second order non-linearity can be estimated by using the product of two dither signals (instead of 3) in, e.g., FIGS. 10 and 11.

An alternative to pseudo-random dither is injecting sine waves. In this case, multiple tones are required to expose the in-band and out-of-band non-linearity accurately. For example, by injecting three tones, with one tone at low frequency and sweeping the frequencies of the other two tones, the in-band and out-of-band nonlinearity can be detected accurately using the same calibration procedures described with reference to FIGS. 12 and 13. Utilizing these procedures with sine waves as described may find the alpha3 that minimizes the third order mean square error or its absolute value integrated over the whole, or a subset of, the frequency range as follows:

$$\varepsilon=\Sigma 10^{IMD_i} BW_i \quad (24)$$

where $\varepsilon$ is the error to be minimized, $IMD_i$ is the total energy of all the IMD components, and $BW_i$ is the bandwidth over which the total energy is valid. The energy is measured for the digital output of the linearization block, and is given by $$D_{nonlincorr}=F^{-1}(h_d^{-1}*D_s) \quad (25)$$

for a non-linearity before the filter. For a non-linearity following the filter, the energy measured on the output may be given by:

$$D_{nonlincorr}=G^{-1}(D_s) \quad (26).$$

It is important to note that while detecting the non-linearity using sine waves may be simpler, it required taking the system offline and interrupting normal operation unless the calibration sine waves unless the calibration sine waves are out of band of the input signal. It is noted that using the procedures described with reference to FIGS. 12 and 13 may remove the frequency dependence and thus the calibration time (and thus, time the system is offline) by not requiring frequency sweeps and using 2 tones or 3 tones at a single frequency only.

Figure 16:
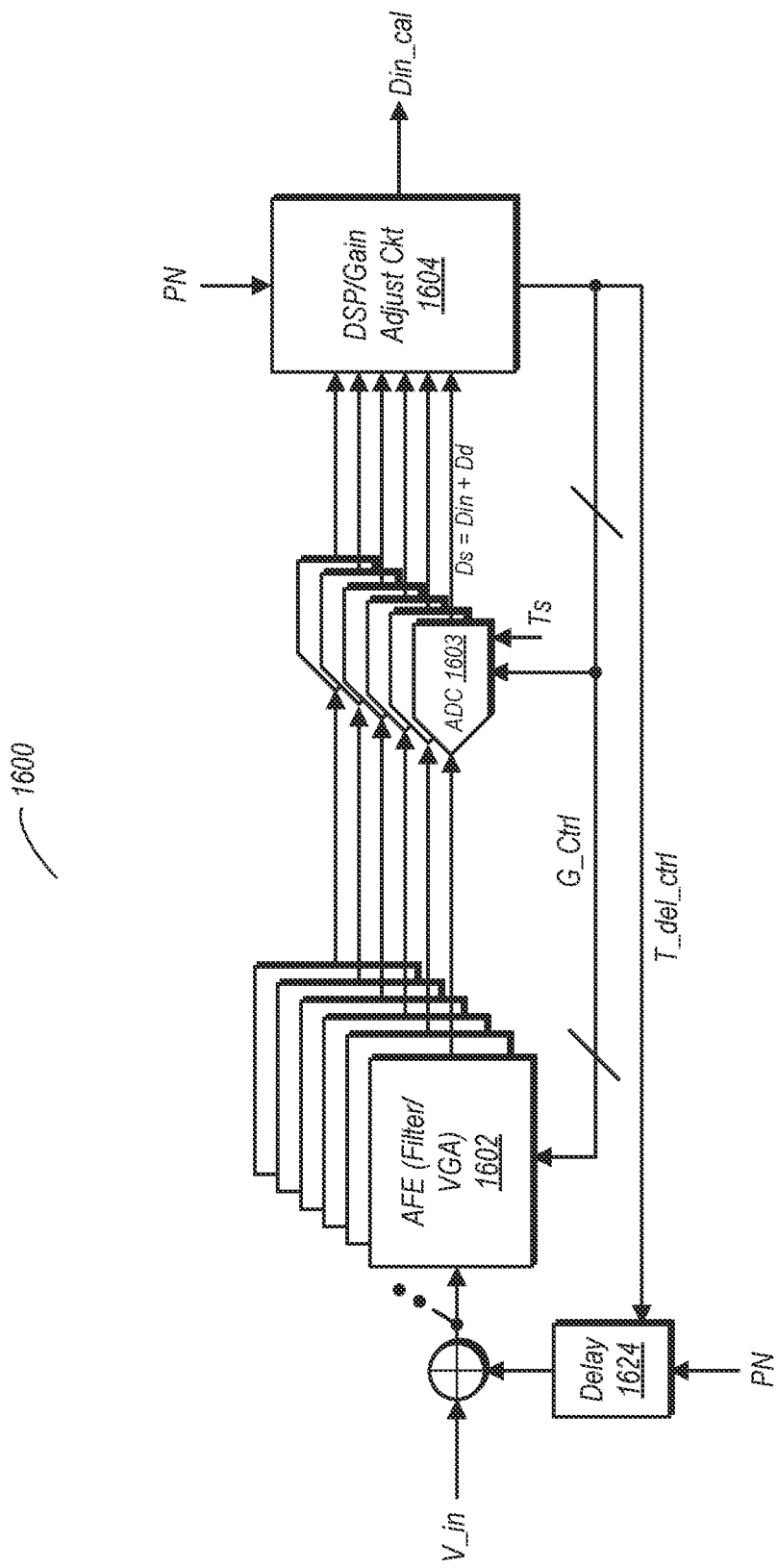
FIG. 16 is a block diagram of one embodiment of an AFE circuit illustrating the injection of a test signal for calibrating gain and timing mismatch.

Test Signal Injection for Multi-Channel AFE and Correcting Interleaving Mismatches:

FIG. 16 is a block diagram of one embodiment of an AFE circuit illustrating the injection of a test signal for calibrating gain and timing/interleaving mismatches. In the embodiment shown, system 1600 is a multi-channel receiver including multiple units of AFE 1602 (each of which includes a filter and a variable gain amplifier in this embodiment), multiple ADCs 1603, and a DSP/gain adjust circuit 1604, which performs digital signal processing including the various calibrations discussed above, as well as generation of control signals based on the calibrations. The filters of the AFEs 1602 may operate in an interleaved fashion, and thus it may be necessary to calibrate out the mismatches between the filters.

A delay circuit 1624 is also included, which, using a delay control signal provided from DSP/gain adjust circuit 1604, applies a delay to a test signal input prior to the AFEs 1602 that is generated based on the dither bit of the pseudorandom sequence PN.

The test signal injected in the AFE filters and VGA scan be used to calibrate the interleaving mismatches. This can also be used to calibrate interleaving mismatches in any other component in the units of AFE 1602. The gain calibrations discussed elsewhere can be employed/binned per filter/VGA and/or ADC slice to match the gain of each slide and hence eliminate the gain mismatch. This can be expressed as follows:

$$G_{ij}(n+1)=G_{ij}(n)-\mu(h_{dc}*h_d*PN_{ij})(h_{dc}*D_{sG_{ij}}-h_{dc}*h_d*PN_{ij}) \quad (27)$$

where $G_{ij}$ is the gain of slice i of the filter/VGA and or slice j of the ADC and $PN_{ij}$ and $D_{sGij}$ are the dither and output samples of slice i of the filter and slice j of the ADC, respectively. Based on the gain estimation, the procedure adjusts the gains of each slice to ensure matching between the different slices. To ensure the accuracy of the DC gain estimation without being influenced by timing mismatch, a separate correlation-based timing mismatch calibration may be used. Moreover, the test signal can be injected at a lower sample rate with the proper corresponding decimation on the digital side to ensure complete settling (as long as the oversampling ratio allows for that). On the other hand, to calibrate the timing/BW mismatch, any calibration procedure that employs correlation between successive samples may be employed. In this approach, the error between two slices in a two-channel interleaving case can be given by:

$$T_l(n+1)=T_l(n)-\mu(D_{sG_k}(n)D_{sG_l}(n-1)-D_{sG_k}(n-1)D_{sG_l}(n-1)) \quad (28),$$

where $T_{kl}$ is the timing or bandwidth adjustment parameter between slices k and l, $D_{sGk}$ is the output of slice k and $D_{sGl}$ is the output of slice l. Since the dither is low-pass filtered by the AFE, its energy is limited to the first Nyquist zone, which ensures accurate convergence. The dither itself can also be low-pass filtered before injection to ensure this condition is satisfied. This correlation approach can be generalized to an arbitrary number of slices (M), where for each adjacent channel k and l the detection is given by:

$$Tl(n+1) = Tl(n) - \mu\left(D_{s_k}(n)D_{s_l}(n) - \frac{1}{M}\sum_{i=1}^{M} D_{s_i}(n)D_{s_j}(n)\right) \quad (29)$$

Where k=l−1, j=i−1 and l ranges between 2 and M, since all slices are matched to the first slice, and:

$$D_{s_0}(n)=D_{s_m}(n-1) \quad (30).$$

Other techniques that rely on minimizing the error between neighboring slices using correlation, or using any other method, can also be used. Moreover, this timing mismatch calibration approach can also work in the absence of dither if an input signal is present. The novelty of the proposed technique is not in the specific formula used but rather in using dither injected in/before the filter for mismatch calibration, irrespective of the details of the correlation approach. In addition, calibration of the filter transfer function mismatch for each of the interleaved filter slices can also be done as mentioned in the previous section.

The mismatch calibration may differ from previous approaches in multiple ways. For one, the proposed techniques target calibrating interleaving mismatches in the AFE, filter and amplifier(s), and not mainly the ADC. Calibration of the ADC may provide a secondary benefit. Second, the dither/test signal injection occurs in the analog signal path before the filter and passes through the filter transfer function. Third, the dither/test signal injection may occur early in the signal chain and may thus avoid the problem of mismatches between the dither/test signal path and the input signal path, which can become an issue at very high frequencies where bandwidth mismatches start to impact accuracy. Fourth, calibration of mismatches in the filter transfer function and coefficients may also be carried out in addition to gain and timing mismatches.

The present disclosure also contemplates calibrating for I/Q mismatches in receivers that utilize QAM. By injecting the dither/test signal at a common point that precedes the I/Q mixer, I/Q mismatches in both amplitude and phase may be captured in a manner similar to the interleaving mismatches described above. In addition, the injected dither/test signal can be filtered to enable relatively narrow-band calibration in different frequency bands as desired.

Figure 17:
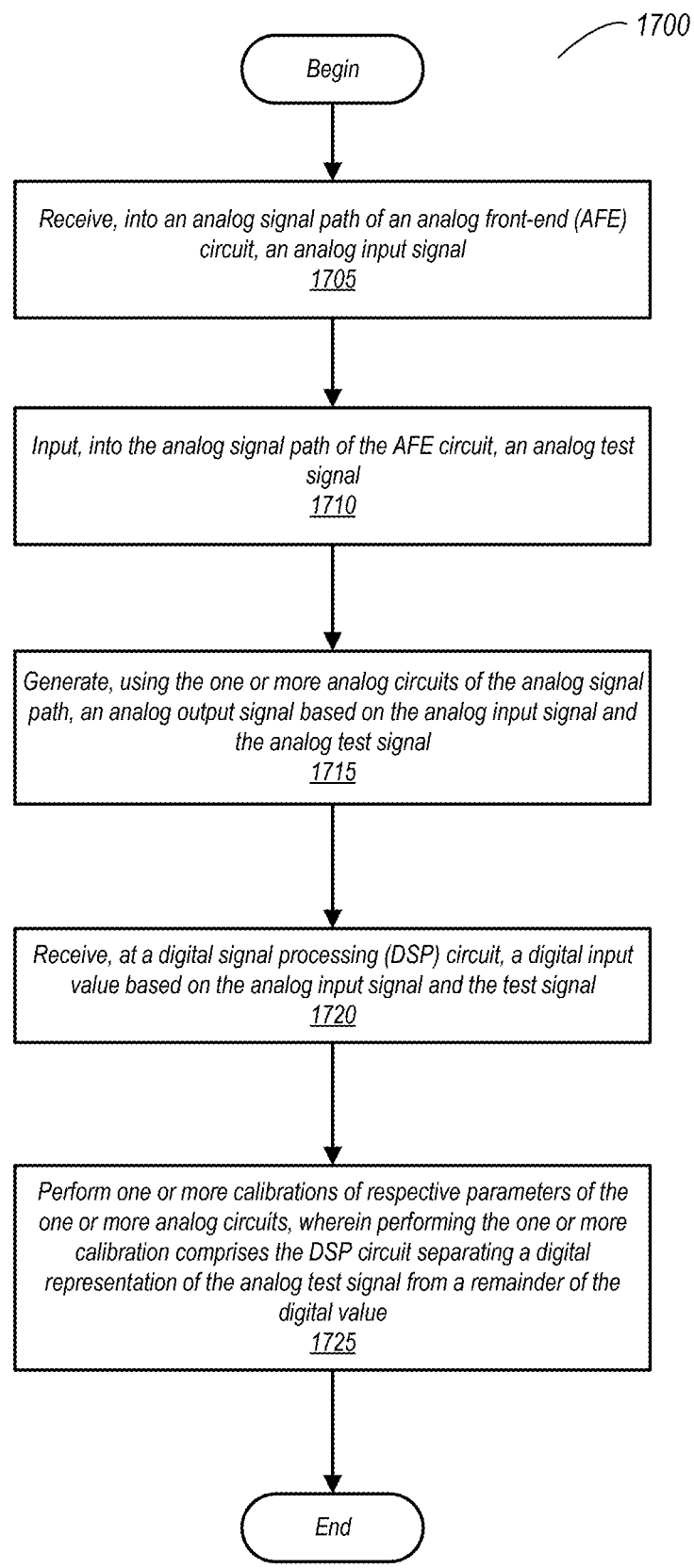
FIG. 17 is a flow diagram of one embodiment of a method for calibrating a filtering AFE circuit.

Method Flow Diagrams:

FIG. 17 is a flow diagram of one embodiment of a method for calibrating an AFE circuit. Method 1700 may be carried out for various embodiments of a system having at least one AFE as disclosed herein, using various ones of the techniques/procedures described. Embodiments of an apparatus not explicitly disclosed herein but arranged for carrying out the various calibrations discussed above are considered to fall within the scope of this disclosure.

Method 1700 includes receiving, into an analog signal path of an analog front-end (AFE) circuit, an analog input signal (block 1705), and inputting, into the analog signal path of the AFE circuit (which may include a filter, such as a low pass filter or a bandpass filter), an analog test signal (block 1710). The method further includes generating, using the one or more analog circuits of the analog signal path, an analog output signal based on the analog input signal and the analog test signal (block 1715), and receiving, at a digital signal processing (DSP) circuit, a digital input value based on the analog input signal and the test signal (block 1720). The method also includes performing one or more calibrations of respective parameters of the one or more analog circuits, wherein performing the one or more calibration comprises the DSP circuit separating a digital representation of the analog test signal from a remainder of the digital value (block 1725).

In various embodiments, the analog test signal is uncorrelated to the analog input signal. Embodiments of the method may also include generating the analog test signal based on a pseudorandom sequence.

In some embodiments, the AFE circuit and the DSP circuit are implemented in a receiver of a communications system. In such embodiments, the inputting, the generating, the receiving a digital input value, and the performing the one or more calibrations are performed concurrently with normal operations of the communications system.

Various parameters may be calibrated within the scope of Method 1700. In one embodiment, performing the one or more calibrations includes calibrating a gain for an amplifier in the AFE circuit. In one embodiment, performing the one or more calibrations includes calibrating a transfer function of a filter in the AFE circuit. Performing the one or more calibrations may include canceling one or more non-linearities in the AFE circuit.

Figure 18:
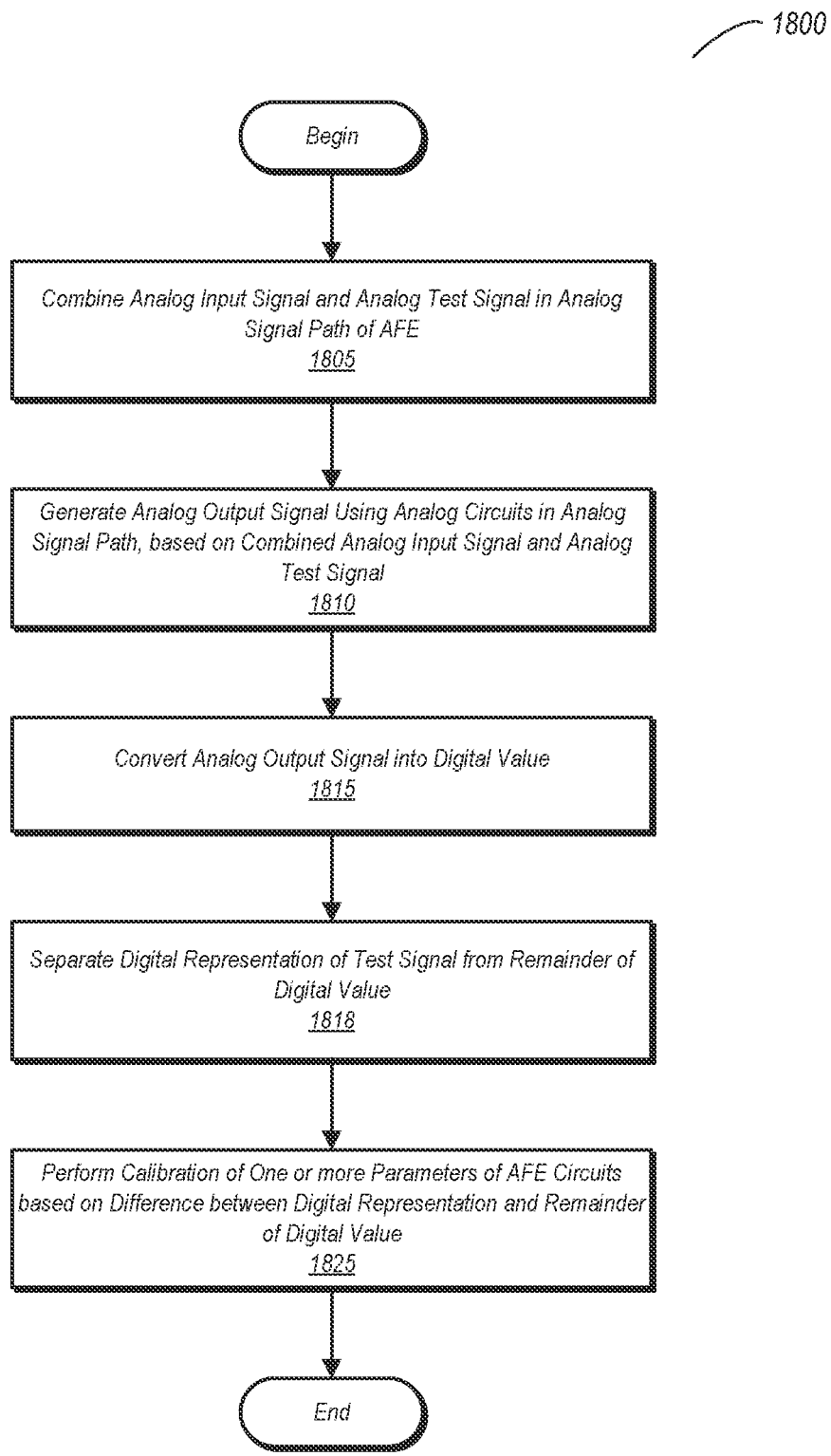
FIG. 18 is a flow diagram of another embodiment of a method for calibrating a filtering AFE circuit.

FIG. 18 is a flow diagram of another embodiment of a method for calibrating an AFE circuit. Method 1800 may be carried out for various embodiments of a system having at least one AFE as disclosed herein, using various ones of the techniques/procedures described. Embodiments of an apparatus not explicitly disclosed herein but arranged for carrying out the various calibrations discussed above are considered to fall within the scope of this disclosure.

Method 1800 includes combining an analog input signal and an analog test signal in an analog signal path of an AFE (block 1805). The method further includes generating an analog output signal (from the AFE), using analog circuits in the analog signal path, based on the combined analog input signal and analog test signal (block 1810). The analog circuits may include various types of filters, amplifiers, mixers, voltage-controlled oscillators, and virtually any other type of circuit that may be implemented in an AFE.

The method may further include converting the combined analog signal into a digital value (block 1815) using an ADC circuit. The digital value may be provided to a DSP circuit. The DSP circuit may then separate the digital representation of the test signal from the remainder of the digital value (block 1820). The method further includes performing calibration of one or more parameters of the AFE circuit based on a difference between the digital representation of the test signal and the remainder of the digital value (block 1825). The various parameters for which calibrations may conducted may include (but are not limited to) filter bandwidth, filter quality factor, amplifier gain, non-linearities, I/Q mismatches (in QAM system), interleaving mismatches, and so on.

Figure 19:
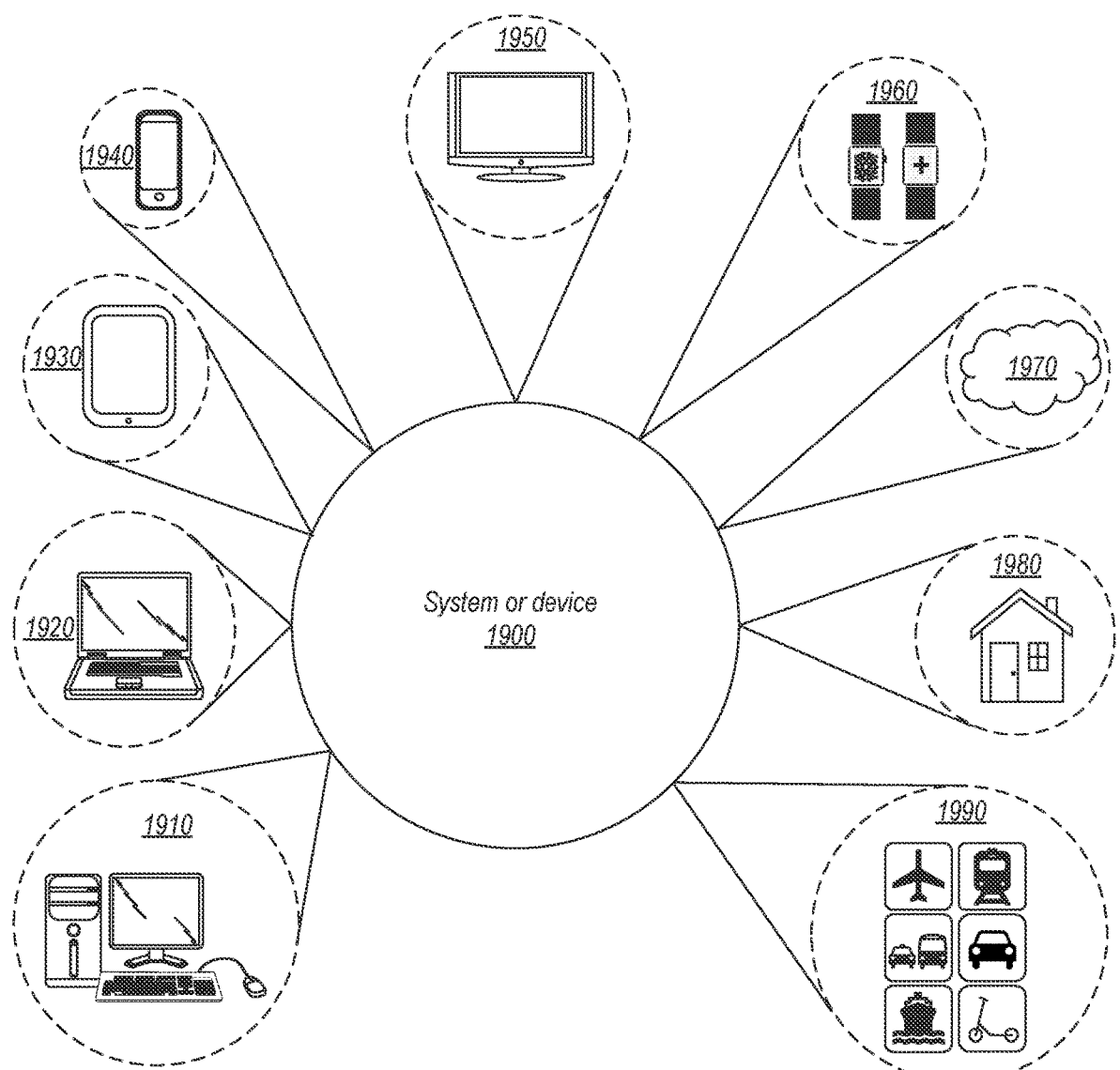
FIG. 19 is a block diagram illustrating example applications of an integrated circuit according to the disclosure.

Example Applications:

Turning now to FIG. 19, various types of systems that may include any of the circuits, devices, or system discussed above. System or device 1900, which may incorporate or otherwise utilize one or more of the techniques described herein, may be utilized in a wide range of areas. For example, system or device 1900 may be utilized as part of the hardware of systems such as a desktop computer 1910, laptop computer 1920, tablet computer 1930, cellular or mobile phone 1940, or television 1950 (or set-top box coupled to a television).

Similarly, disclosed elements may be utilized in a wearable device 1960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1900 may also be used in various other contexts. For example, system or device 1900 may be utilized in the context of a server computer system, such as a dedicated server or on shared hardware that implements a cloud-based service 1970. Still further, system or device 1900 may be implemented in a wide range of specialized everyday devices, including devices 1980 commonly found in the home such as refrigerators, thermostats, security cameras, etc. The interconnection of such devices is often referred to as the "Internet of Things" (IoT). Elements may also be implemented in various modes of transportation. For example, system or device 1900 could be employed in the control systems, guidance systems, entertainment systems, etc. of various types of vehicles 1990.

The applications illustrated in FIG. 19 are merely exemplary and are not intended to limit the potential future applications of disclosed systems or devices. Other example applications include, without limitation: portable gaming devices, music players, data storage devices, unmanned aerial vehicles, etc. The disclosure also contemplates applications including head-mounted devices, dual-display devices, other types of wearable devices not otherwise mentioned above, and various types of multimedia devices.
Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 20:
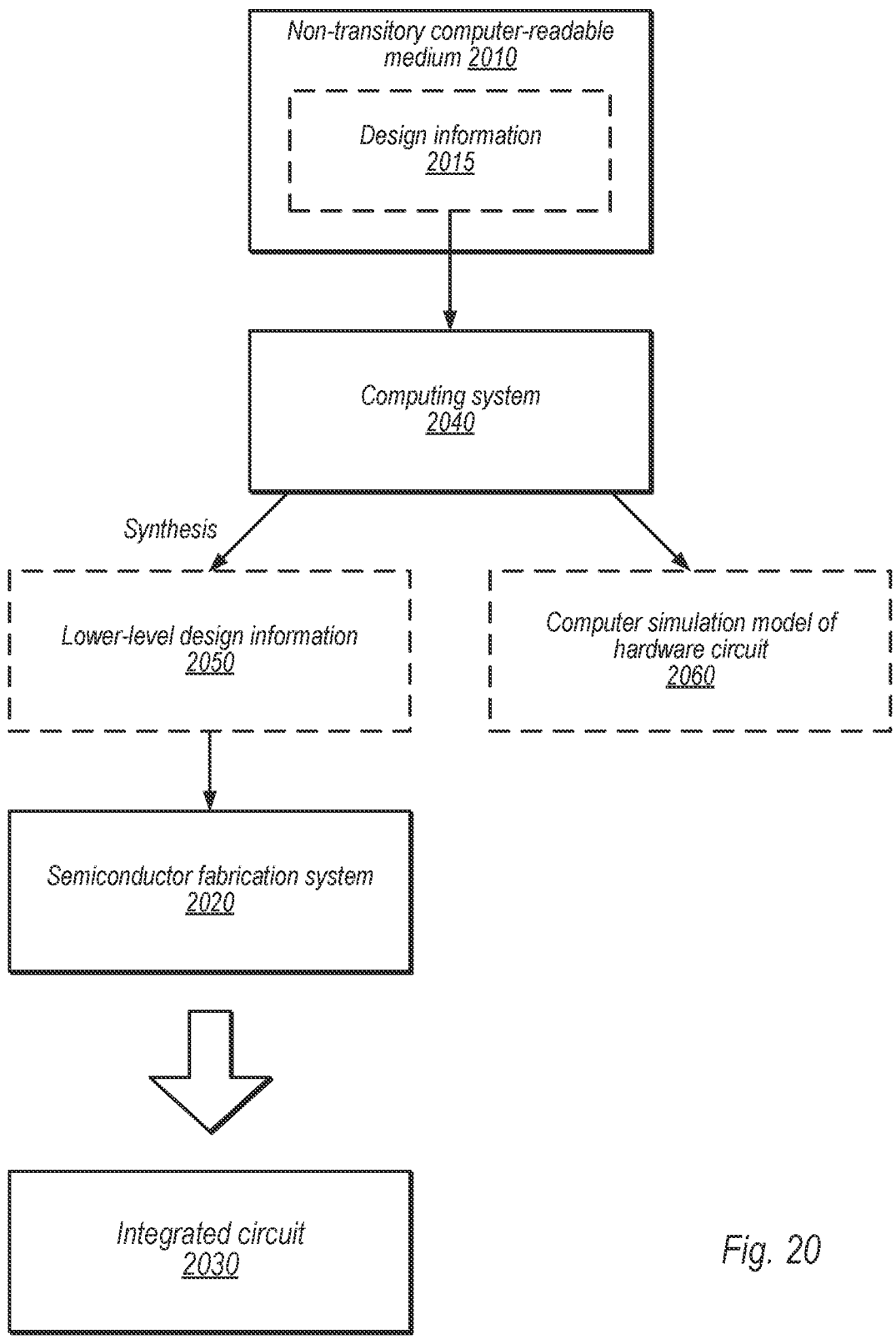
FIG. 20 is a block diagram of one embodiment of a computer readable medium and a manufacturing system capable of manufacturing a circuit according to the disclosure.

FIG. 20 is a block diagram illustrating an example non-transitory computer-readable storage medium that stores circuit design information, according to some embodiments. In the illustrated embodiment, computing system 2040 is configured to process the design information. This may include executing instructions included in the design information, interpreting instructions included in the design information, compiling, transforming, or otherwise updating the design information, etc. Therefore, the design information controls computing system 2040 (e.g., by programming computing system 2040) to perform various operations discussed below, in some embodiments.

In the illustrated example, computing system 2040 processes the design information to generate both a computer simulation model of a hardware circuit 2060 and lower-level design information 2050. In other embodiments, computing system 2040 may generate only one of these outputs, may generate other outputs based on the design information, or both. Regarding the computing simulation, computing system 2040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 2040 also processes the design information to generate lower-level design information 2050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 2050 (potentially among other inputs), semiconductor fabrication system 2020 is configured to fabricate an integrated circuit 2030 (which may correspond to functionality of the simulation model 2060). Note that computing system 2040 may generate different simulation models based on design information at various levels of description, including information 2050, 2015, and so on. The data representing design information 2050 and model 2060 may be stored on medium 2010 or on one or more other media.

In some embodiments, the lower-level design information 2050 controls (e.g., programs) the semiconductor fabrication system 2020 to fabricate the integrated circuit 2030. Thus, when processed by the fabrication system, the design information may program the fabrication system to fabricate a circuit that includes various circuitry disclosed herein.

Non-transitory computer-readable storage medium 2010, may comprise any of various appropriate types of memory devices or storage devices. Non-transitory computer-readable storage medium 2010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 2010 may include other types of non-transitory memory as well or combinations thereof. Accordingly, non-transitory computer-readable storage medium 2010 may include two or more memory media; such media may reside in different locations—for example, in different computer systems that are connected over a network.

Design information 2015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 2040, semiconductor fabrication system 2020, or both. In some embodiments, design information may also include one or more cell libraries that specify the synthesis, layout, or both of integrated circuit 2030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 2030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists.

Mask design data may be formatted according to graphic data system (GDSII), or any other suitable format.

Semiconductor fabrication system 2020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2020 may also be configured to perform various testing of fabricated circuits for correct operation.

In various embodiments, integrated circuit 2030 and model 2060 are configured to operate according to a circuit design specified by design information 2015, which may include performing any of the functionality described herein. For example, integrated circuit 2030 may include any of various elements shown in FIGS. 1-16 above. Further, integrated circuit 2030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 2020 to fabricate integrated circuit 2030.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   an analog front-end (AFE) circuit configured to receive an analog input signal, wherein the AFE circuit includes an analog signal path having one or more analog circuits implemented therein;
   a test signal generator configured to input an analog test signal into the analog signal path, wherein the AFE circuit is configured to combine the analog input signal and the analog test signal and further configured to generate, using one or more analog circuits in the analog signal path, an analog output signal based on the analog input signal combined with the analog test signal; and
   a digital signal processing (DSP) circuit configured to process a digital input value that corresponds to the analog output signal, wherein the DSP circuit is configured to perform calibrations of respective parameters of the one or more analog circuits, wherein to perform the calibrations, the DSP circuit is configured to separate a digital representation of the analog test signal from a remainder of the digital input value.

2. The apparatus of claim 1, further comprising an analog-to-digital converter (ADC) circuit coupled to the AFE circuit, wherein the ADC circuit is configured to convert the analog output signal generated by the AFE circuit into the digital input value.

3. The apparatus of claim 1, wherein processing performed by the AFE circuit includes recovering information embedded in the analog input signal.

4. The apparatus of claim 1, wherein the analog test signal is uncorrelated with the analog input signal.

5. The apparatus of claim 1, wherein the analog test signal is based on a pseudorandom sequence.

6. The apparatus of claim 1, further comprising a receiver circuit of a communications system, the receiver circuit including the AFE circuit and the DSP circuit, wherein the DSP circuit is configured to conduct the calibrations concurrent with normal operations of the communications system.

7. The apparatus of claim 1, wherein the calibrations include a calibration of a transfer function of a filter in the AFE circuit.

8. The apparatus of claim 1, wherein the calibrations include a calibration of filter coefficients for an analog finite impulse response (FIR) filter in the AFE circuit.

9. The apparatus of claim 1, wherein the calibrations include calibration of a gain of an amplifier in the AFE circuit.

10. The apparatus of claim 1, wherein the DSP circuit is configured to, in carrying out the calibrations, perform one or more corrections in a digital domain.

11. The apparatus of claim 1, wherein the calibrations include canceling one or more non-linearities in the AFE circuit.

12. A method comprising:
receiving, into an analog signal path of an analog front-end (AFE) circuit, an analog input signal;
inputting, into the analog signal path of the AFE circuit, an analog test signal;
generating, using one or more analog circuits in the analog signal path, an analog output signal based on the analog input signal and the analog test signal;
receiving, at a digital signal processing (DSP) circuit, a digital input value based on the analog input signal and the analog test signal; and
performing one or more calibrations of respective parameters of the one or more analog circuits, wherein performing the one or more calibration comprises the DSP circuit separating a digital representation of the analog test signal from a remainder of the digital input value.

13. The method of claim 12, wherein the analog test signal is uncorrelated to the analog input signal.

14. The method of claim 12, further comprising generating the analog test signal based on a pseudorandom sequence.

15. The method of claim 12, wherein the AFE circuit and the DSP circuit are implemented in a receiver of a communications system, and wherein the inputting, the generating, the receiving a digital input value, and the performing the one or more calibrations is performed concurrently with normal operations of the communications system.

16. The method of claim 12, wherein performing the one or more calibrations includes calibrating a gain for a filter in the AFE circuit.

17. The method of claim 12, wherein performing the one or more calibrations includes calibrating a transfer function of a filter in the AFE circuit.

18. The method of claim 12, wherein performing the one or more calibrations includes canceling one or more non-linearities in the AFE circuit.

19. A system comprising:
a receiver circuit of a communications system, wherein the receiver circuit includes:
an analog front end (AFE) circuit, wherein the AFE circuit includes a plurality of analog circuits including a combiner circuit configured to receive an analog input signal and an analog test signal to form a combined signal, and further configured to inject the combined signal into an analog signal path of the AFE circuit that includes one or more of the plurality of analog circuits, wherein the analog test signal is not correlated with the analog input signal;
an analog-to-digital converter circuit configured to convert the combined signal into a digital value; and
a digital signal processing (DSP) circuit configured to receive the digital value, wherein the DSP circuit is configured to separate a digital representation of the analog test signal from the digital value and further configured to perform one or more calibrations of the plurality of analog circuits based on the digital representation of the analog test signal.

20. The system of claim 19, wherein the AFE circuit includes:
at least one amplifier circuit, wherein the DSP circuit is configured to calibrate a gain of the at least one amplifier circuit based on the digital representation of the analog test signal; and
at least one filter circuit, wherein the DSP circuit is configured to calibrate a transfer function and a bandwidth of the at least one filter circuit based on the digital representation of the analog test signal.

* * * * *

UNITED STATES PATENT AND TRADEMARK OFFICE
CERTIFICATE OF CORRECTION

| | |
|---|---|
| PATENT NO. | : 12,457,049 B2 |
| APPLICATION NO. | : 18/581137 |
| DATED | : October 28, 2025 |
| INVENTOR(S) | : Ahmed Mohamed Abdelatty Ali et al. |

It is certified that error appears in the above-identified patent and that said Letters Patent is hereby corrected as shown below:

In the Specification

In Column 2, Line 16, please delete "a diagram a diagram" and insert -- a diagram --.

In Column 6, Line 23, please delete "combined signal 114" and insert -- combined analog signal --.

In Column 10, Line 27, please delete "AFE 300" and insert -- AFE 305 --.

In Column 10, Line 41, please delete "mixer 111," and insert -- mixer 311 --.

In Column 21, Lines 55-56, please delete "unless the calibration sine waves unless the calibration sine waves" and insert -- unless the calibration sine waves --.

Signed and Sealed this
Thirteenth Day of January, 2026

John A. Squires
*Director of the United States Patent and Trademark Office*